US011435609B2

(12) United States Patent
Miyachi et al.

(10) Patent No.: US 11,435,609 B2
(45) Date of Patent: *Sep. 6, 2022

(54) LIQUID CRYSTAL DISPLAY DEVICE

(71) Applicant: Sharp Kabushiki Kaisha, Sakai (JP)

(72) Inventors: Koichi Miyachi, Sakai (JP); Masanobu Mizusaki, Sakai (JP); Tsuyoshi Okazaki, Sakai (JP); Hiroshi Tsuchiya, Sakai (JP); Isamu Miyake, Sakai (JP); Toshihiro Matsumoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/149,920

(22) Filed: Jan. 15, 2021

(65) Prior Publication Data

US 2021/0132421 A1 May 6, 2021

Related U.S. Application Data

(63) Continuation of application No. 16/215,708, filed on Dec. 11, 2018, now Pat. No. 10,921,623, which is a continuation of application No. 15/506,900, filed as application No. PCT/JP2015/073646 on Aug. 24, 2015, now Pat. No. 10,197,829.

(30) Foreign Application Priority Data

Aug. 29, 2014 (JP) .............................. JP2014-176376

(51) Int. Cl.
| | |
|---|---|
| *G02F 1/1333* | (2006.01) |
| *G02F 1/133* | (2006.01) |
| *C09K 19/54* | (2006.01) |
| *C08G 73/10* | (2006.01) |
| *C08F 32/00* | (2006.01) |
| *C09K 19/30* | (2006.01) |
| *G02F 1/1337* | (2006.01) |
| *G02F 1/1335* | (2006.01) |
| *C09K 19/04* | (2006.01) |
| *C09K 19/12* | (2006.01) |
| *C08F 222/10* | (2006.01) |

(52) U.S. Cl.
CPC .............. *G02F 1/133* (2013.01); *C08F 32/00* (2013.01); *C08G 73/10* (2013.01); *C09K 19/3098* (2013.01); *C09K 19/54* (2013.01); *G02F 1/1337* (2013.01); *G02F 1/133528* (2013.01); *G02F 1/133788* (2013.01); *C08F 222/1025* (2020.02); *C09K 2019/0448* (2013.01); *C09K 2019/122* (2013.01); *C09K 2019/3009* (2013.01); *C09K 2019/3016* (2013.01); *G02F 1/133533* (2013.01); *G02F 1/133545* (2021.01)

(58) Field of Classification Search
CPC ................ C09K 19/3098; C09K 19/54; C09K 2019/0448; C09K 2019/122; C09K 2019/3009; C09K 2019/3016; G02F 1/133; G02F 1/1333; G02F 1/133528; G02F 1/1337; G02F 1/133788; C08F 32/00; C08G 73/10
See application file for complete search history.

(56) References Cited

U.S. PATENT DOCUMENTS

| | | | | |
|---|---|---|---|---|
| 10,197,829 B2* | 2/2019 | Miyachi | ................. | C08G 73/10 |
| 10,203,558 B2* | 2/2019 | Miyachi | ................. | C09K 19/54 |
| 10,921,623 B2* | 2/2021 | Miyachi | ................. | G02F 1/133 |

OTHER PUBLICATIONS

Miyachi et al., "Liquid Crystal Display Device", U.S. Appl. No. 16/215,708, filed Dec. 11, 2018.

* cited by examiner

*Primary Examiner* — Geraldina Visconti
(74) *Attorney, Agent, or Firm* — Keating & Bennett, LLP

(57) ABSTRACT

The present invention provides a liquid crystal display device that, with photo-alignment films, can maintain a favorable voltage holding ratio for a long period of time and prevent generation of image sticking and stains on the display screen. The liquid crystal display device includes: an active-matrix liquid crystal panel; and a backlight, the liquid crystal panel including a liquid crystal layer, paired substrates holding the liquid crystal layer in between, and alignment films disposed on the liquid crystal layer side surfaces of the respective substrates, the alignment films each being a photo-alignment film formed from a material exhibiting photo-alignment performance, the liquid crystal layer containing a liquid crystal material and a radical scavenger.

10 Claims, 4 Drawing Sheets

(R : Structure such as alkyl group constituting liquid crystal, alignment films, and sealant)

(Antioxidant)

Consumption of antioxidant ⇒ oxidation of LC
Cannot be converted back to antioxidant (phenol)

LIQUID CRYSTAL DISPLAY DEVICE

TECHNICAL FIELD

The present invention relates to liquid crystal display devices. More specifically, the present invention relates to a liquid crystal display device configured to control the alignment of liquid crystal molecules with alignment films.

BACKGROUND ART

Liquid crystal display devices are display devices utilizing a liquid crystal composition for display. The typical display mode thereof is irradiating a liquid crystal panel containing a liquid crystal composition sealed between paired substrates with backlight illumination and applying voltage to the liquid crystal composition to change the alignment of the liquid crystal molecules, thereby controlling the amount of light passing through the liquid crystal panel. Such liquid crystal display devices have features including a thin profile, light weight, and low power consumption, and have therefore been used for electronic devices such as smartphones, tablet PCs, and car navigation systems. The pixel resolution has been increased for uses such as smartphones, which has led to a tendency of an increase in the number of conductive lines and the area of the black matrix disposed in the liquid crystal panel.

In a liquid crystal display device, the alignment of liquid crystal molecules with no voltage applied is typically controlled by alignment films on which an alignment treatment has been performed. The alignment treatment has conventionally been performed by the rubbing method of rubbing the surface of an alignment film with a tool such as a roller. However, since the number of the conductive lines and the area of the black matrix disposed in the liquid crystal panel have been increased, irregularities are now more likely to occur on the substrate surfaces in the liquid crystal panel. With irregularities on the substrate surfaces, the portions near the irregularities may not be properly rubbed by the rubbing method. Such a non-uniform alignment treatment may cause a decrease in the contrast ratio in the liquid crystal display device.

In order to deal with this problem, studies and development have been made on a photo-alignment method which is an alternative alignment treatment method to the rubbing method and irradiates the surface of an alignment film with light. With the photo-alignment method, an alignment treatment can be performed without contact with the surface of the alignment film. The photo-alignment method therefore has an advantage that alignment treatment is less likely to be uneven even with irregularities on a substrate surface, so that a favorable liquid crystal alignment can be achieved on the entire substrate.

Moreover, the increase in the number of conductive lines and the area of the black matrix disposed in the liquid crystal panel may decrease the area ratio of openings usable for display (aperture ratio). Such a decrease in the aperture ratio will be a direct cause of a decrease in the amount of light that can pass through the liquid crystal panel. Significantly increasing the luminance of the backlight has therefore been considered to maintain the display performance, including the contrast ratio, of liquid crystal display devices.

Meanwhile, liquid crystal compositions used for liquid crystal display devices have been desired to have higher stability such that the compositions can withstand the load in the production processes of liquid crystal display devices and contribute to long-term stability of the produced liquid crystal display devices. For example, Patent Literature 1 discloses addition of an antioxidant and a light stabilizer to the liquid crystal composition. Patent Literature 2 also discloses addition of a stabilizer to the liquid crystal composition (see Table C in paragraphs [0208] to [0211]).

CITATION LIST

Patent Literature

Patent Literature 1: JP 2007-197731 A
Patent Literature 2: JP 2011-515543 T

SUMMARY OF INVENTION

Technical Problem

To respond to the increased pixel resolution, the photo-alignment method has been developed and the luminance of the backlight has been increased. These attempts, however, have been found to result in an increased tendency of occurrence of stains (unevenness) at the edges of the screen of a liquid crystal panel and at the edges of a displayed box pattern. Such defects at the edges of a displayed box pattern are detected as image sticking.

The inventors of the present invention have made various studies, and came to an idea that the image sticking and stains described above occur through the following steps.
(1) Generation of Radicals Irradiation of the liquid crystal panel with backlight illumination (amount of energy: hv) excites a photo-functional group contained in the photo-alignment films as shown in the following scheme (A-I), causing the photo-functional group to cleave and thereby generate radicals. Especially in the case of using a backlight with an increased luminance, the generation of radicals is noticeable.

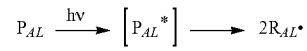

(A-I)

$P_{AL}$: Photo-functional group in photo-alignment film
$R_{AL}$: Radical generated from photo-alignment film (2-1) First Ion Generation The radicals generated in the photo-alignment films are released into the liquid crystal layer, and the released radicals are ionized.
(2-2) Second Ion Generation The radicals generated in the photo-alignment films are released into the liquid crystal layer and transfer from the photo-functional groups to the liquid crystal molecules, so that the liquid crystal molecule are ionized.
(3) Decrease in Voltage Holding Ratio The ions in the liquid crystal layer accumulate at the edges of the screen of the liquid crystal panel or at the edges of a displayed box pattern. The voltage holding ratio (VHR) at these edges decreases to cause the image sticking and stains described above.

As described above, some conventional liquid crystal compositions contain additives such as an antioxidant and a light stabilizer. These additives, however, could not solve the problems unique to the use of photo-alignment films. That is, in liquid crystal display devices, in the case that oxygen in the outside enters the liquid crystal panel to oxidize the liquid crystal material, the oxidants may unfortunately cause image sticking and stains in the displayed images. In order to prevent these defects, additives such as an antioxidant having a function of eliminating oxygen from the oxidants generated under light or heat in the presence of oxygen have conventionally been added to the liquid crystal composition. Yet, in the case that radicals are generated from the photo-alignment films and react with the antioxidant, the reaction consumes the antioxidant. The antioxidant therefore fails to function as intended, allowing oxidation of the liquid crystal molecules and the alignment films to proceed. The oxidants generated here may also be ionized to cause a decrease in the voltage holding ratio.

The present invention has been made in view of such a current state of the art, and aims to provide a liquid crystal display device that, with photo-alignment films, can maintain a favorable voltage holding ratio for a long period of time and prevent generation of image sticking and stains on the display screen.

Solution to Problem

The inventors of the present invention have focused on the decrease in the voltage holding ratio at the edges of the screen of the liquid crystal panel and the edges of a displayed box pattern in a liquid crystal display device with photo-alignment films, which causes defects such as image sticking and stains on the display screen. The inventors of the present invention have then made intensive studies, and have first found that the defects are caused by a phenomenon in which radicals are generated in the photo-alignment films exposed to the backlight illumination and the generated radicals are released into the liquid crystal layer. The inventors have found that this problem can be solved by adding a radical scavenger to the liquid crystal layer, thereby completing the present invention.

One aspect of the present invention may be a liquid crystal display device, including: an active-matrix liquid crystal panel; and a backlight. The liquid crystal panel may include a liquid crystal layer, paired substrates holding the liquid crystal layer in between, and alignment films disposed on the liquid crystal layer side surfaces of the respective substrates. The alignment films may each be a photo-alignment film formed from a material exhibiting photo-alignment performance. The liquid crystal layer may contain a liquid crystal material and a radical scavenger.

Advantageous Effects of Invention

The liquid crystal display device of the present invention, having the above configuration, can deactivate the radicals released into the liquid crystal layer with the radical scavenger, preventing a decrease in the voltage holding ratio. Thus, the liquid crystal display device, with photo-alignment films, can maintain a favorable voltage holding ratio for a long period of time and prevent generation of image sticking and stains on the display screen.

DESCRIPTION OF EMBODIMENTS

Hereinafter, an embodiment of the present invention is described. The contents of the following embodiment are not intended to limit the scope of the present invention, and the design may appropriately be changed within the spirit of the configuration of the present invention.

Figure 1:
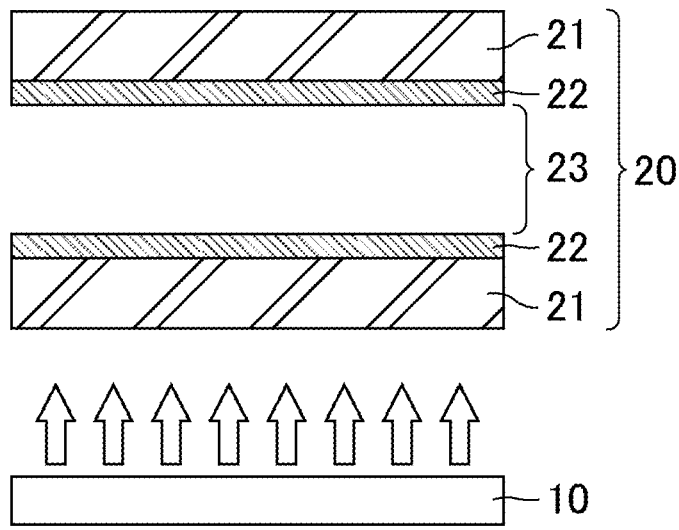
FIG. 1 is a cross-sectional view schematically illustrating a liquid crystal display device of the present embodiment.

FIG. 1 is a cross-sectional view schematically illustrating a liquid crystal display device of the present embodiment. The liquid crystal display device of the present embodiment includes an active-matrix liquid crystal panel 20 and a backlight 10. The liquid crystal panel 20 includes a liquid crystal layer 23, paired substrates 21 holding the liquid crystal layer 23 in between, and alignment films 22 disposed on the liquid crystal layer 23 side surfaces of the respective substrates 21. The alignment films 22 each are a photo-alignment film formed from a material exhibiting photo-alignment performance. The liquid crystal layer 23 contains a liquid crystal material and a radical scavenger.

The active-matrix liquid crystal panel 20 may be any active-matrix liquid crystal panel including the liquid crystal layer 23, the substrates 21 holding the liquid crystal layer 23 in between, and the alignment films 22 disposed on the liquid crystal layer 23 side surfaces of the respective substrates 21, and can be a common liquid crystal panel in an active-matrix display mode. In the active-matrix display mode, usually, signal voltage is applied to the electrodes through thin-film transistors (TFTs) while the active elements such as the TFTs in the respective pixels are on, and the charges supplied to the pixels are held while the active elements are off. The ratio of holding the supplied charges during one frame (for example, 16.7 ms) is the voltage holding ratio (VHR). That is, a low VHR means that the voltage applied to the liquid crystal layer is likely to decay over time. Thus, in the active-matrix display mode, a high VHR is desired.

Examples of the paired substrates 21 include a combination of an active matrix substrate (TFT substrate) and a color filter (CF) substrate. The active matrix substrate can be one commonly used in the field of liquid crystal display devices. The configuration of the active matrix substrate in a plan view may be one including, on a transparent substrate, gate signal lines parallel to each other; source signal lines that extend in the direction orthogonal to the gate signal lines and are parallel to each other; active elements such as TFTs disposed on the respective intersections of the gate signal lines and the source signal lines; and pixel electrodes disposed in a matrix form in the respective regions defined by the gate signal lines and the source signal lines, for example. In the case of a horizontal alignment mode, the configuration further includes common lines and counter electrodes connected to the common lines, for example. Suitable examples of the TFTs include those including a channel made of an oxide semiconductor, indium-gallium-zinc-oxide (IGZO).

The color filter substrate can be one commonly used in the field of liquid crystal display devices. The configuration of the color filter substrate may be one including, on a transparent substrate, a black matrix formed in a grid pattern, and color filters formed inside the respective grids, i.e., pixels, for example.

Here, both the color filters and the active matrix may be formed on one of the paired substrates 21.

The substrates 21 and the liquid crystal layer 23 hold the respective alignment films 22 in between. Each alignment film 22 has a function of controlling the alignment of liquid crystal molecules in the liquid crystal layer 23. With voltage lower than the threshold voltage applied to the liquid crystal layer 23 (including the case of no voltage application), the liquid crystal display device mainly utilizes the alignment films 22 to control the alignment of the liquid crystal molecules in the liquid crystal layer 23. The angle of the major axis of each liquid crystal molecule from the surface of one of the substrates 21 in such a controlled state is referred to as a "pre-tilt angle". The "pre-tilt angle" as used herein refers to the angle of tilt of liquid crystal molecules from the direction parallel to the substrate surface, with the angle direction parallel to the substrate surface being 0° and the angle direction which is the same as the substrate surface normal direction being 90°.

The alignment films 22 may provide any pre-tilt angle to the liquid crystal molecules. The alignment films 22 may be horizontal alignment films or vertical alignment films, but are preferably horizontal alignment films. In the case that the alignment films 22 are horizontal alignment films, the pre-tilt angle is preferably substantially 0° (e.g., smaller than 10°), more preferably 0° for achievement of the effect of maintaining favorable contrast characteristics for a long period of time. In the case that the display mode is the IPS mode or FFS mode, the pre-tilt angle is also preferably 0° from the viewpoint of viewing angle characteristics, whereas in the case that the display mode is the TN mode, the pre-tilt angle is preferably set to about 2°, for example, due to the restrictions in the mode.

The alignment films 22 are photo-alignment films formed from a material exhibiting photo-alignment performance. The material exhibiting photo-alignment performance means any general material that, when irradiated with light (electromagnetic waves) such as ultraviolet light or visible light, undergoes a structural change to exhibit performance (alignment force) of controlling the alignment of the nearby liquid crystal molecules, or to change in the alignment force power and/or direction.

Examples of the material exhibiting photo-alignment performance include those including a photo-reactive site that undergoes a reaction such as dimerization (dimer formation), isomerization, photo-Fries rearrangement, or decomposition, when irradiated with light. Suitable examples of the photo-reactive site (functional group) that undergoes dimerization and isomerization when irradiated with light include cinnamate represented by the following formula (B-1), 4-chalcone represented by the following formula (B-2-1), 4'-chalcone represented by the following formula (B-2-2), coumarin represented by the following formula (B-3), and stilbene represented by the following formula (B-4). The following scheme (B-1-I) shows the isomerization and dimerization reactions of cinnamate.

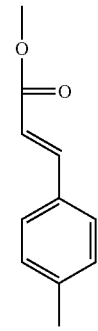

(B-1)

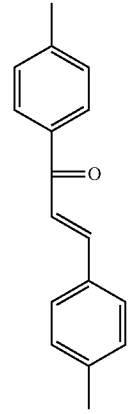

(B-2-1)

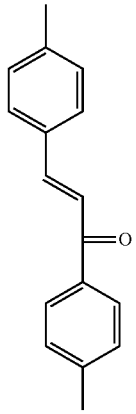

(B-2-2)

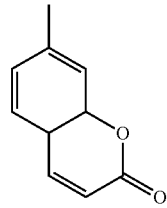

(B-3)

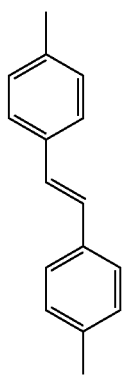

(B-4)

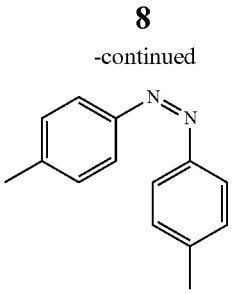

(B-5-2)

Suitable examples of the photo-reactive site that undergoes photo-Fries rearrangement when irradiated with light include a phenolic ester structure represented by the following formula (B-6). The phenol ester structure undergoes photo-Fries rearrangement as shown in the following scheme (B-6-I).

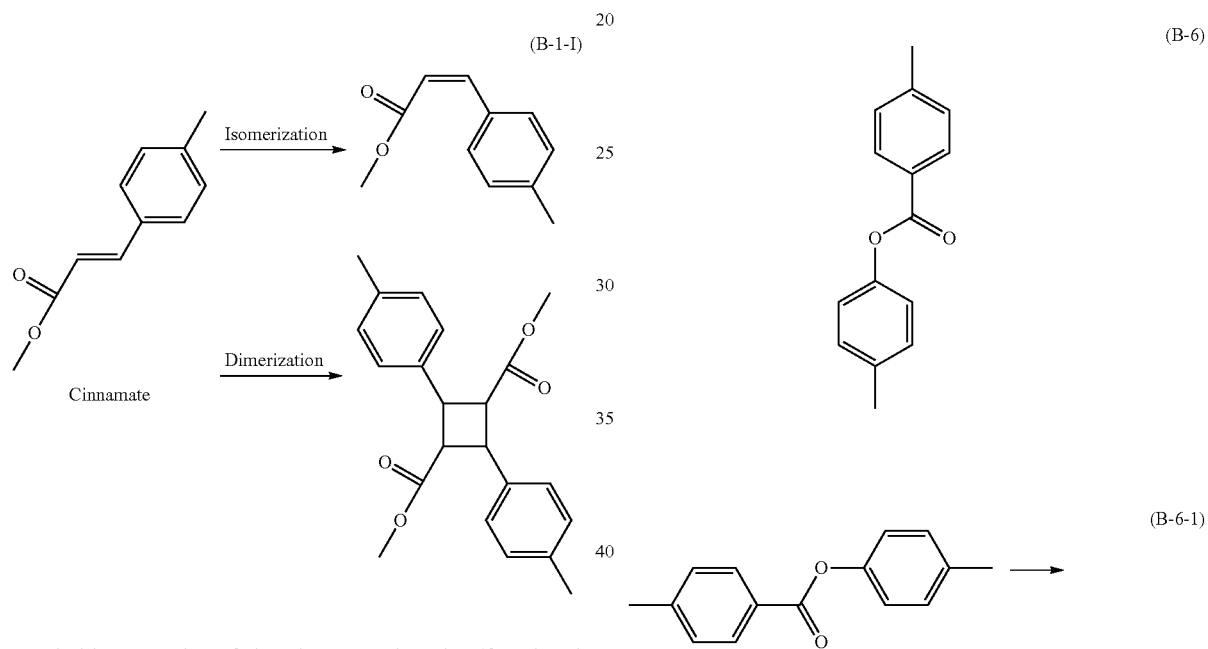

Suitable examples of the photo-reactive site (functional group) that undergoes isomerization when irradiated with light include azobenzene. The following formula (B-5-1) shows trans-azobenzene, and the following formula (B-5-2) shows cis-azobenzene.

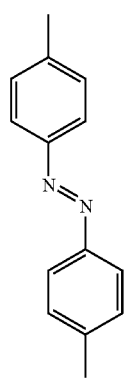

(B-5-1)

Suitable examples of the photo-reactive site that undergoes decomposition when irradiated with light include a cyclobutane structure. Examples of photo-alignment films containing a cyclobutane structure include a polymer obtained by copolymerizing the following monomers: an acid anhydride that is represented by the following formula (B-7-1) and contains a cyclobutane structure; and an amine compound represented by the following formula (B-7-2). As shown in the following scheme (B-7-I), the cyclobutane structure in this polymer cleaves when irradiated with light, exhibiting photo-alignment performance. The hydrogen atoms in the cyclobutane structure shown in the following formula (B-7-1) may each be replaced by another atom or a functional group.

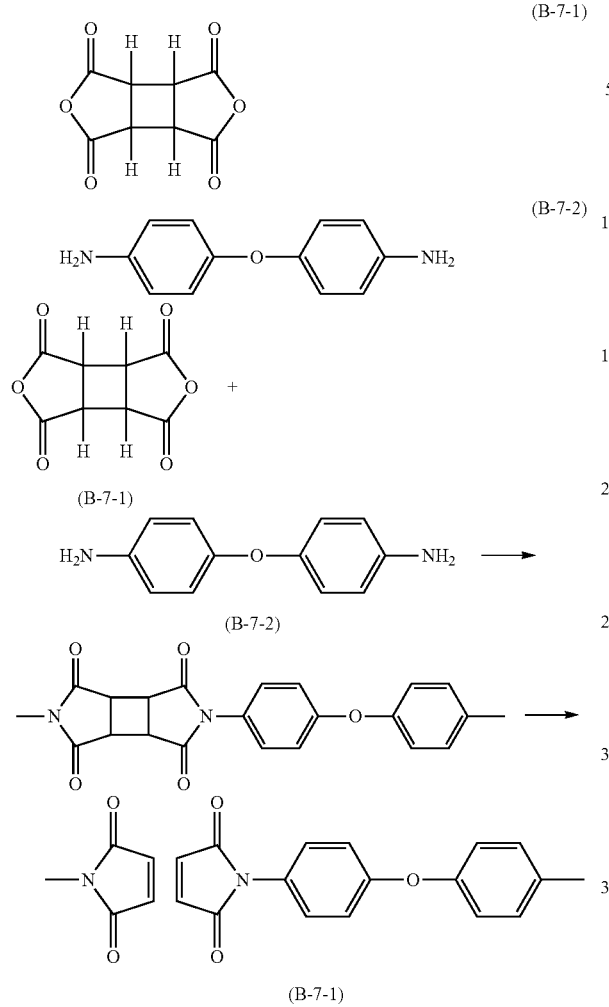

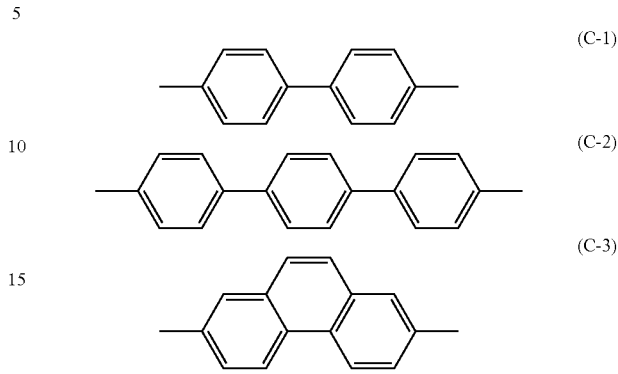

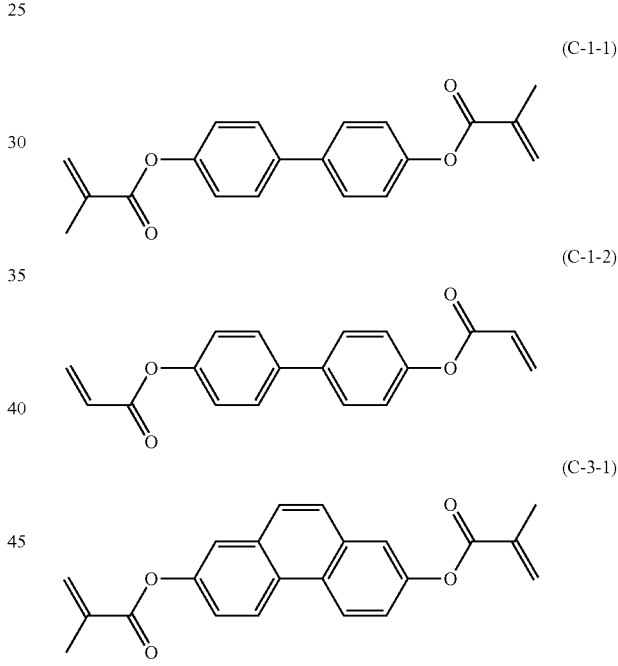

The present embodiment may employ a polymer sustained alignment (PSA) technique. The PSA technique fixes the initial tilt (pre-tilt) of the liquid crystal using a polymer. The polymer here is formed on the surfaces of the alignment films 22 by sealing a liquid crystal composition containing a photo-polymerizable monomer between the paired substrates 21, and irradiating the resulting liquid crystal layer 23 with light to polymerize the photo-polymerizable monomer.

Examples of a configuration employing the PSA technique include one including, on the liquid crystal layer 23 side surface of each of the alignment films 22, a layer containing a polymer tat is obtained by polymerizing a photo-polymerizable monomer represented by the following formula (C):

<p style="text-align:center">A1-Y-A2     (C)</p> wherein Y represents a structure containing at least one benzene ring and/or a condensed benzene ring; hydrogen atoms in the benzene ring and the condensed benzene ring may each be replaced by a halogen atom; at least one of A1 and A2 represents an acrylate or a methacrylate; and A1 and A2 each directly bind to the benzene ring or the condensed benzene ring.

The skeleton Y in the above formula (C) is preferably a structure represented by the following formula (C-1), (C-2), or (C-3). The hydrogen atoms in the following formulas (C-1), (C-2), and (C-3) may each individually be replaced by a halogen atom.

Specific examples of the photo-polymerizable monomer represented by the above formula (C) include those represented by the following formula (C-1-1), (C-1-2), or (C-3-1).

In the present embodiment, the liquid crystal layer 23 contains a liquid crystal material and a radical scavenger.

<Liquid Crystal Material>

The liquid crystal material may have a negative or positive value for the anisotropy of dielectric constant (As) defined by the following formula (P). That is, the liquid crystal material may have negative anisotropy of dielectric constant or positive anisotropy of dielectric constant. The liquid crystal material having negative anisotropy of dielectric constant may be one with an anisotropy of dielectric constant Δε of −1 to −20, for example. The liquid crystal material having positive anisotropy of dielectric constant may be one with an anisotropy of dielectric constant Δε of 1 to 20, for example.

$$\Delta\varepsilon=(\text{dielectric constant in the major axis direction})-(\text{dielectric constant in the minor axis direction}) \quad (P)$$

In conventional liquid crystal display devices without any radical scavengers, the defects, namely image sticking and stains, tend to appear more significantly in the case of a liquid crystal material having negative anisotropy of dielectric constant than in the case of a liquid crystal material having positive anisotropy of dielectric constant. This is presumably because large polarization appears in the minor axis direction in a liquid crystal material having negative anisotropy of dielectric constant, with which the liquid crystal display device becomes more susceptible to a decrease in VHR when the liquid crystal molecules are ionized. That is, the radical scavenger used in the present invention achieves a large effect in a system utilizing a liquid crystal material having negative anisotropy of dielectric constant and photo-alignment films in combination.

The liquid crystal material preferably contains at least a compound containing an alkenyl structure. Examples of the compound containing an alkenyl structure include compounds represented by the following formula (D-1), (D-2), or (D-3).

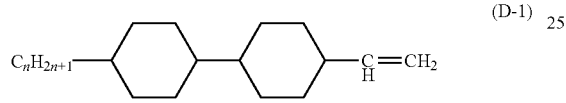

(D-1)

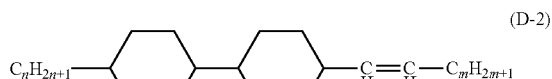

(D-2)

(D-3)

In the formulas, m and n are the same or different integers, and are each preferably 1 to 6.

Specific examples of the compounds containing an alkenyl structure represented by the above formula (D-1) include those represented by the following formula (D-1-1).

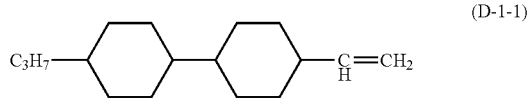

(D-1-1)

The liquid crystal material preferably contains at least a compound containing an alkoxy structure. Examples of the compound containing an alkoxy structure include compounds represented by the following formula (E-1), (E-2), (E-3), (E-4), or (E-5).

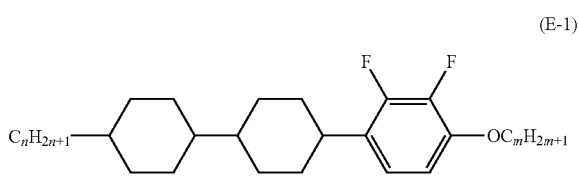

(E-1)

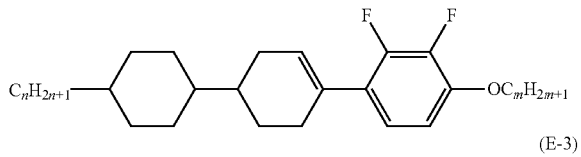

(E-2)

(E-3)

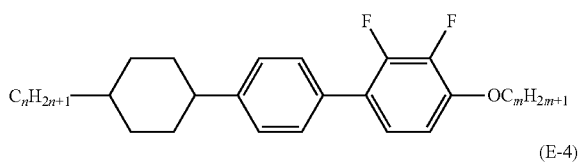

(E-4)

(E-5)

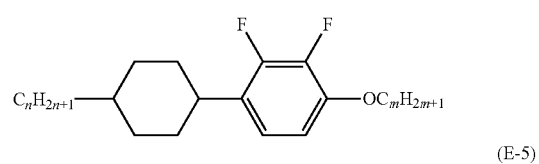

In the formulas, m and n are the same or different integers, and are each preferably 1 to 7.

Specific examples of the compounds containing an alkoxy structure represented by the above formula (E-3) include compounds represented by the following formula (E-3-1).

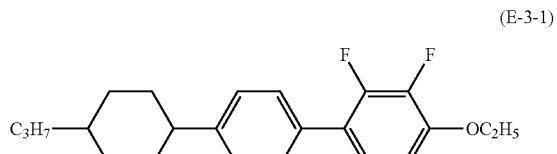

(E-3-1)

<Radical Scavenger>

The radical scavenger may be any radical scavenger that is reactive with alignment film radicals generated from the photo-alignment films and with liquid crystal radicals formed by transfer of the alignment film radicals to the liquid crystal, and that thereby deactivates the alignment film radicals and the liquid crystal radicals. Suitable examples thereof include hindered amine compounds. The hindered amine compounds are regarded as having a tendency of being concentrated in the vicinities of the alignment films and being able to selectively react with alignment film radicals generated from the photo-alignment films because they are not much soluble in a liquid crystal material but are highly compatible with amine and carboxylic acid present in the photo-alignment films.

Figure 2:
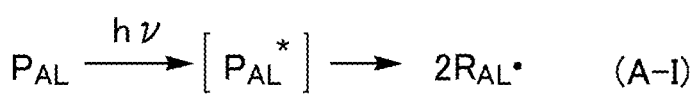
FIG. 2 is a view describing the reaction mechanism of deactivating radicals generated from photo-alignment films with a hindered amine compound (radical scavenger).
Figure 2:
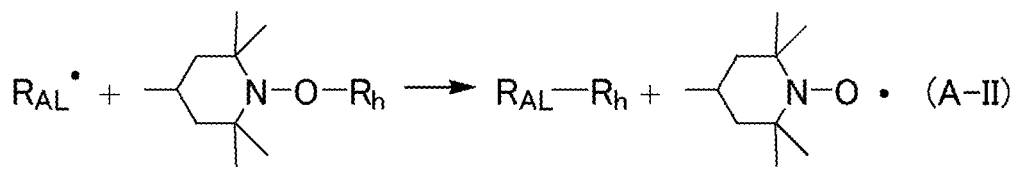
Figure 2:
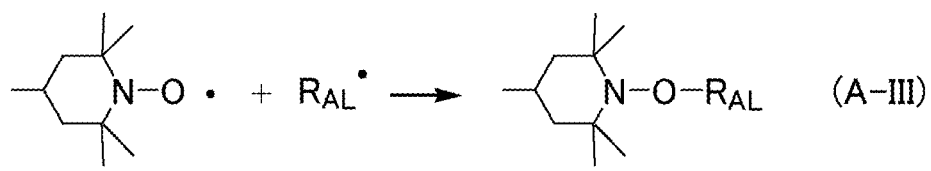
Figure 2:
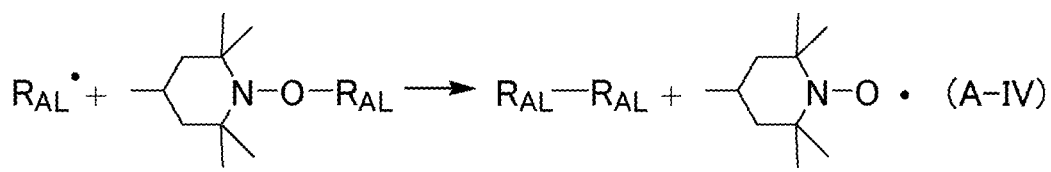

FIG. 2 is a view describing the reaction mechanism of deactivating radicals generated from photo-alignment films with a hindered amine compound (radical scavenger). As shown in the scheme (A-I) in FIG. 2, a photo-functional group $P_{AL}$ in the photo-alignment films is excited to generate alignment film radicals $R_{AL}$ when irradiated with light (amount of energy: hν). As shown in the scheme (A-II) in FIG. 2, a hindered amine compound added to the liquid crystal material constituting the liquid crystal layer 23 can selectively react with an alignment film radical $R_{AL}$ to deactivate the alignment film radical $R_{AL}$. Here, the hindered amine compound itself having reacted with an alignment film radical $R_{AT}$, is turned into a hindered amine radical. The $R_h$ in the scheme (A-II) represents a hydrocarbon group derived from the hindered amine compound. As shown in the scheme (A-III) in FIG. 2, the hindered amine radical then binds to another alignment film radical $R_{AL}$, so that both the hindered amine radical and the alignment film radical $R_{AL}$ disappear. Also, as shown in the scheme (A-IV) in FIG. 2, the compound formed as a result of binding of the hindered amine radical to the alignment film radical $R_{AL}$ also functions as a radical scavenger by further reacting with yet another alignment film radical $R_{AL}$ to generate another hindered amine radical. The resulting hindered amine radical is also a radical scavenger reactive with an alignment film radical $R_{AL}$, as shown in the scheme (A-III). Through these steps, a circulative cycle of scheme (A-I)→scheme (A-II)→scheme (A-III)→scheme (A-I)→scheme (A-IV) →scheme (A-III)→and so forth proceeds in a system to which a hindered amine compound (radical scavenger) is added. As a result, the radical scavenger can keep deactivating the generated radicals without reduction in its amount, and therefore can keep inhibiting generation of ions from the radicals for a long period of time. That is, a small amount of the hindered amine compound (radical scavenger) enables reduction of a decrease in VHR due to exposure to the backlight illumination for a long period of time.

Also, the hindered amine compound, being highly reactive with radicals generated from the photo-alignment films, can readily deactivate the radicals in the liquid crystal layer 23. Hence, in the case of using the hindered amine compound together with an antioxidant, the hindered amine compound can effectively lessen the chance for the antioxidant to react with and be consumed by the radicals generated from the photo-alignment films, and thus can also lessen the chance of generation of oxides in the liquid crystal layer. Accordingly, the hindered amine compound can also prevent image sticking and stains caused by oxides.

Furthermore, as a result of greatly reducing generation of ions in the liquid crystal layer 23 with a radical scavenger such as a hindered amine compound, the frame duration in driving of the liquid crystal display device can be lengthened. That is, a radical scavenger enables driving of the liquid crystal display device at a low frequency, and thereby enables reduction of the power consumption to a low level.

Examples of the hindered amine compound include compounds represented by the following formula (F-1) or (F-2), with particularly suitable examples being compounds represented by the following formula (F-1).

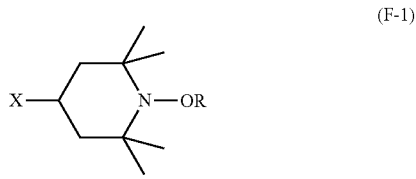

(F-1)

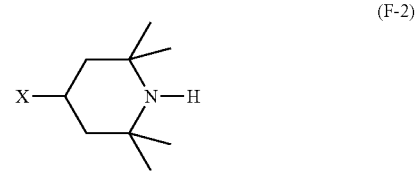

(F-2)

In the formulas, X represents a monovalent organic group and R represents a hydrocarbon group.

Specific examples of the hindered amine compounds represented by the above formula (F-1) include compounds represented by the following formula (F-1-1), (F-1-2), (F-1-3), (F-1-4), or (F-1-5).

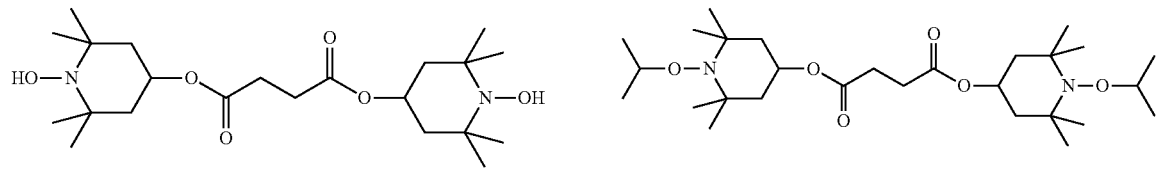

(F-1-1)

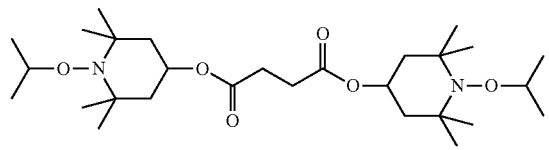

(F-1-2)

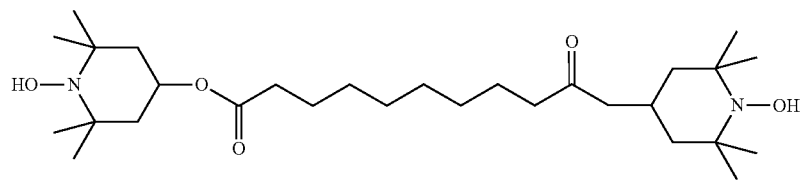

(F-1-3)

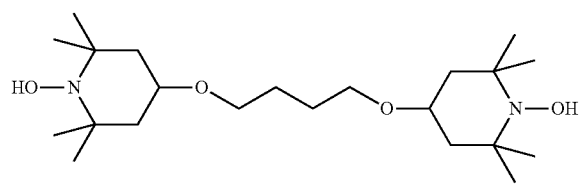

(F-1-4)

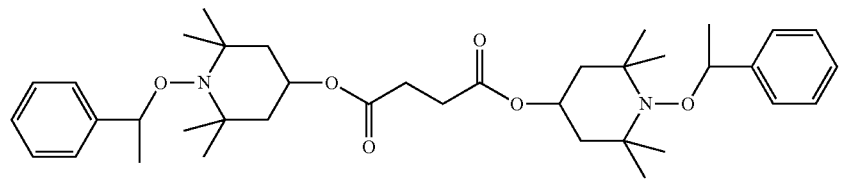
(F-1-5)

Specific examples of the hindered amine compounds represented by the above formula (F-2) include compounds represented by the following formula (F-2-1) or (F-2-2). The hindered amine compound may have a structure similar to the compounds represented by the above formula (F-2), such as a compound represented by the following formula (F-2-3) obtained by replacing the hydrogen atom with a methyl group.

The hindered amine compound may have a structure containing a radical site as shown in a compound represented by the following formula (F-3). Specific examples thereof include structures represented by the following formula (F-3-1), (F-3-2), or (F-3-3).

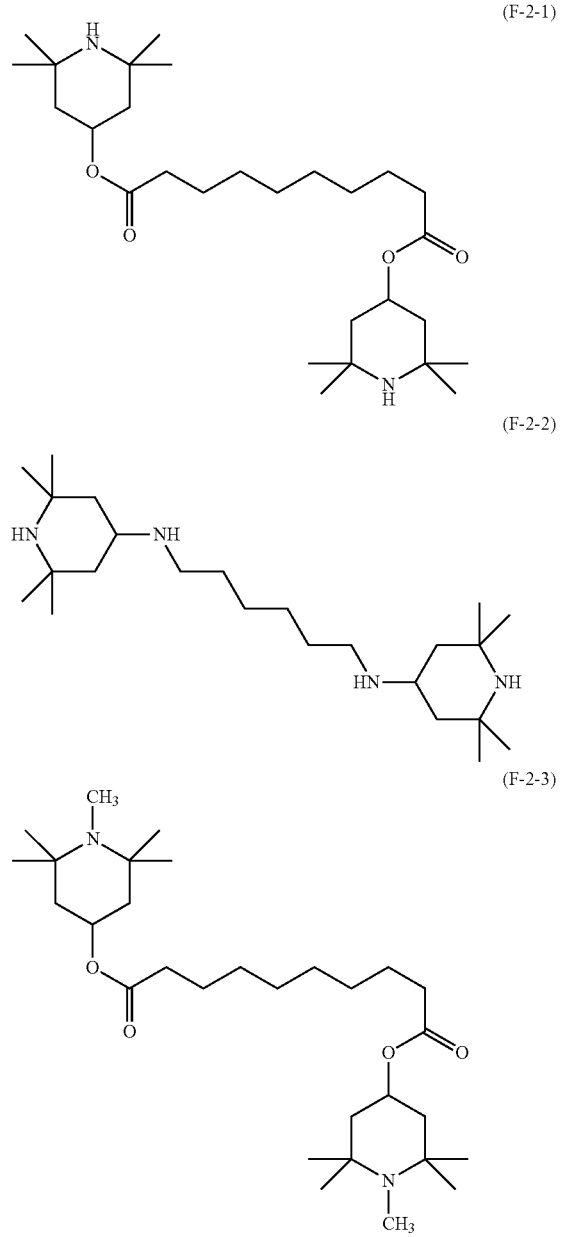

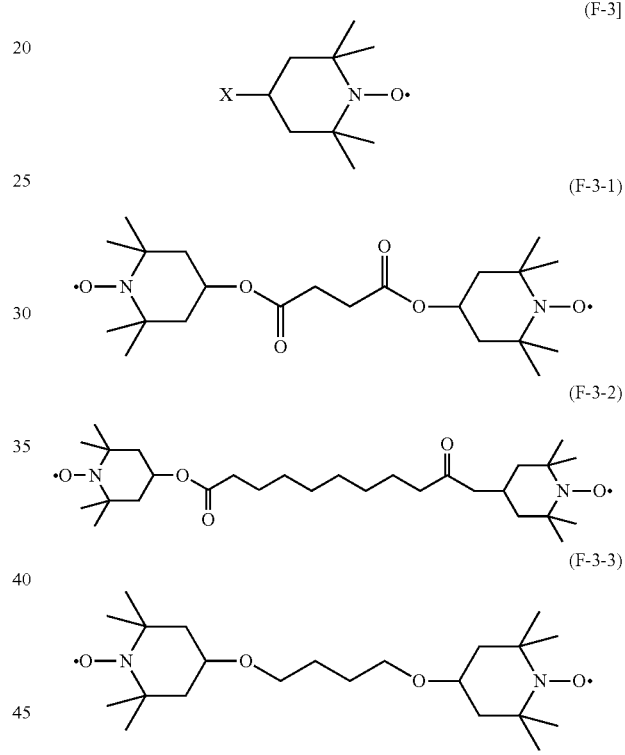

The concentration of the radical scavenger (hindered amine compound) is preferably in the range of 1 ppm to 1000 ppm. The radical scavenger contained at a concentration in such a range can sufficiently deactivate radicals generated from the photo-alignment films, particularly sufficiently achieving the effect of reducing a decrease in VHR. Here, since radicals of a hindered amine are stable, too high a concentration of the hindered amine compound may not be suited for reduction of a decrease in VHR. For this reason, the later-described antioxidant may also be added instead of increasing the concentration of the hindered amine compound. The upper limit of the concentration of the radical scavenger (hindered amine compound) is more preferably 500 ppm, still more preferably 250 ppm.

<Antioxidant>

The liquid crystal layer 23 may further contain an antioxidant. The antioxidant may be any antioxidant that is more reactive with oxygen or oxides than with the liquid crystal material. Suitable examples thereof include phenolic antioxidants.

Figure 3:
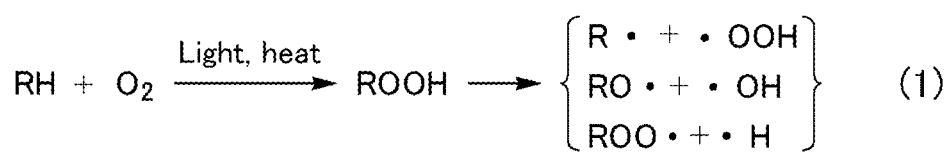
FIG. 3 is a view describing the effect of a phenolic antioxidant in the present invention.
Figure 3:
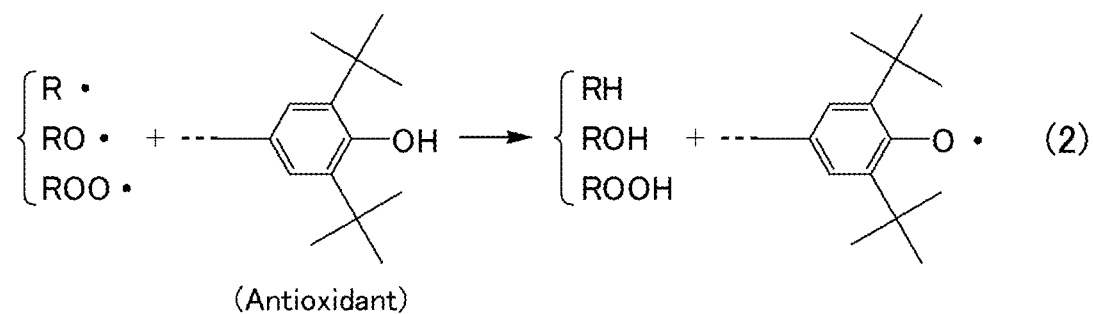
Figure 3:
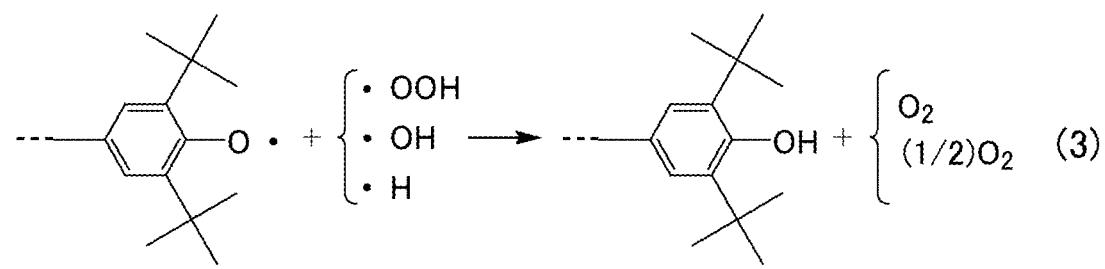

FIG. 3 is a view describing the effect of a phenolic antioxidant in the present invention. As shown in the scheme (1) in FIG. 3, when oxygen enters the liquid crystal panel and the panel is exposed to light or heat energy, a structure such as an alkyl group (R) contained in the liquid crystal material, alignment films, and sealant is oxidized into an oxidant (ROOH). The oxidant generates radicals which are ionized in the absence of an antioxidant or radical scavenger. When the liquid crystal material is oxidized and then ionized, ions are generated in the liquid crystal layer 23. In addition, also when the alignment films and sealant are oxidized, the oxidants dissociated from the polymers constituting the alignment films and the sealant are ionized and released into the liquid crystal layer 23, so that ions are generated in the liquid crystal layer 23. The ions in the liquid crystal layer 23 decrease the VHR. In contrast, as shown in the schemes (2) and (3) in FIG. 3, an antioxidant added reacts with radicals before the radicals are ionized, preventing generation of ions caused by oxidation of the liquid crystal material, photo-alignment films, and sealant. Also, since the amount of the antioxidant does not decrease in the cycles shown in the schemes (2) and (3) in FIG. 3, the antioxidant can prevent ionization of radicals for a long period of time.

Figure 4:
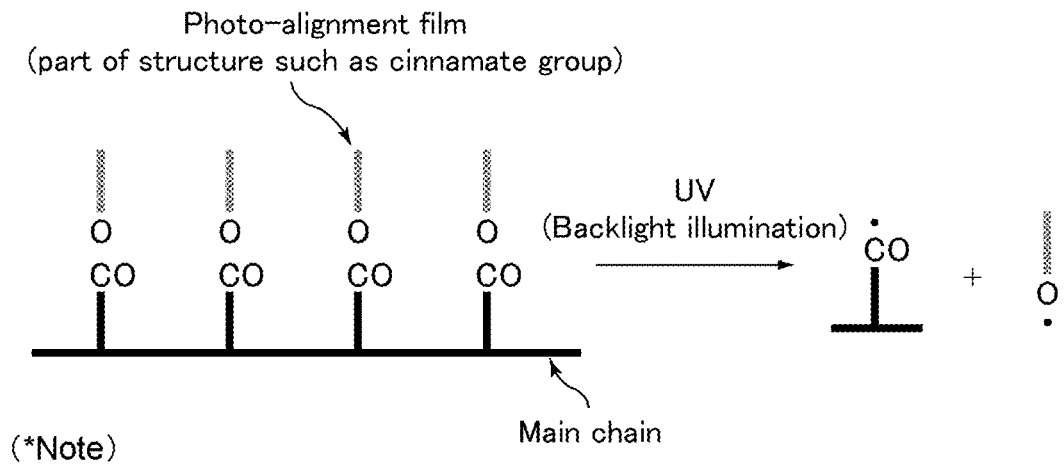
FIG. 4 is a view describing the reaction between a phenolic antioxidant and a photo-reactive film.
Figure 4:
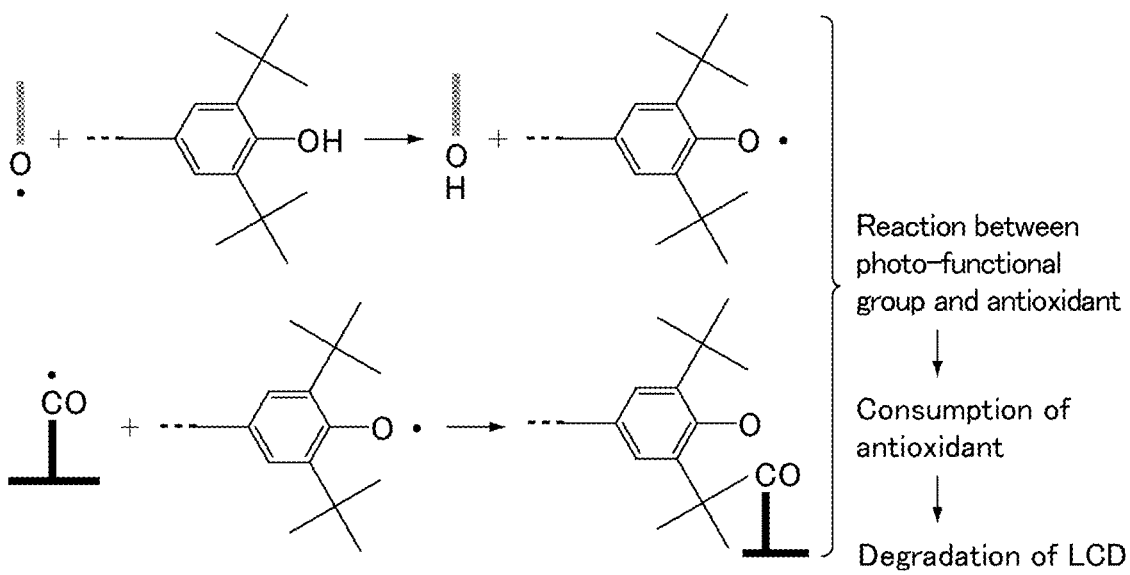

As shown in FIG. 3, the antioxidant undergoes the repeated cycle of hydrogen group elimination→addition→elimination to eliminate (reduce) oxygen from oxides, and thereby reduce degradation (decomposition and ionization) due to oxidation for a long period of time. Still, the antioxidant may be consumed in a reaction between the antioxidant and the photo-alignment films, for example. FIG. 4 is a view describing the reaction between a phenolic antioxidant and a photo-reactive film. As shown in FIG. 4, in the case that a cinnamate group (photo-functional group) cleaves to generate radicals when irradiated with ultraviolet light from the backlight, the antioxidant reacts with any of the radicals and turns into an antioxidant radical. Here, the antioxidant radical may bind to the photo-alignment film side radical generated upon cleavage of the cinnamate group. In this case, since the antioxidant having bound to the photo-alignment film side radical cannot be converted back to the antioxidant, the amount of the antioxidant in the liquid crystal layer 23 gradually decreases. Such consumption of the antioxidant for a long period of time may inhibit sufficient prevention of oxidation of the liquid crystal layer 23 and the photo-alignment films. Although FIG. 4 illustrates the case of a cinnamate group, the consumption of the antioxidant has been found to occur in the same manner also in the case of another photo-functional group such as an azobenzene group. In order to prevent such consumption of the antioxidant, the present embodiment utilizes an antioxidant in combination with a radical scavenger. A radical scavenger traps radicals in the alignment films and the liquid crystal regardless of whether the radicals are generated by oxides or not, and prevents ionization of the radicals by repeating trapping and releasing the radicals. With a radical scavenger that is more reactive with the radicals than the antioxidant and keeps trapping the radicals in the photo-alignment films and the liquid crystal, the antioxidant is presumably prevented from being consumed in the above reaction and can maintain the anti-oxidation function.

Examples of the phenolic antioxidants include those represented by the following formula (G). Specific examples thereof include those represented by the following formula (G-1), (G-2), or (G-3).

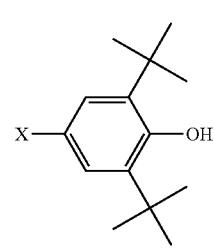

(G)

In the formula, X represents a monovalent organic group.

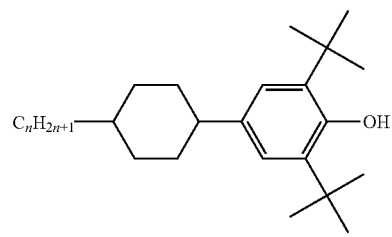

(G-1)

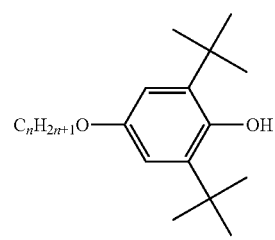

(G-2)

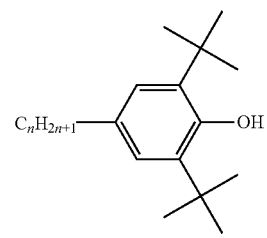

(G-3)

In the formulas, n represents an integer and is preferably an integer of 3 to 20.

Specific examples of the phenolic antioxidants represented by the above formula (G) include compounds represented by the following formula (G-a), (G-b), (G-c), (G-d), (G-e), (G-f), or (G-g).

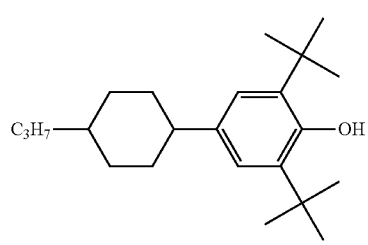

(G-a)

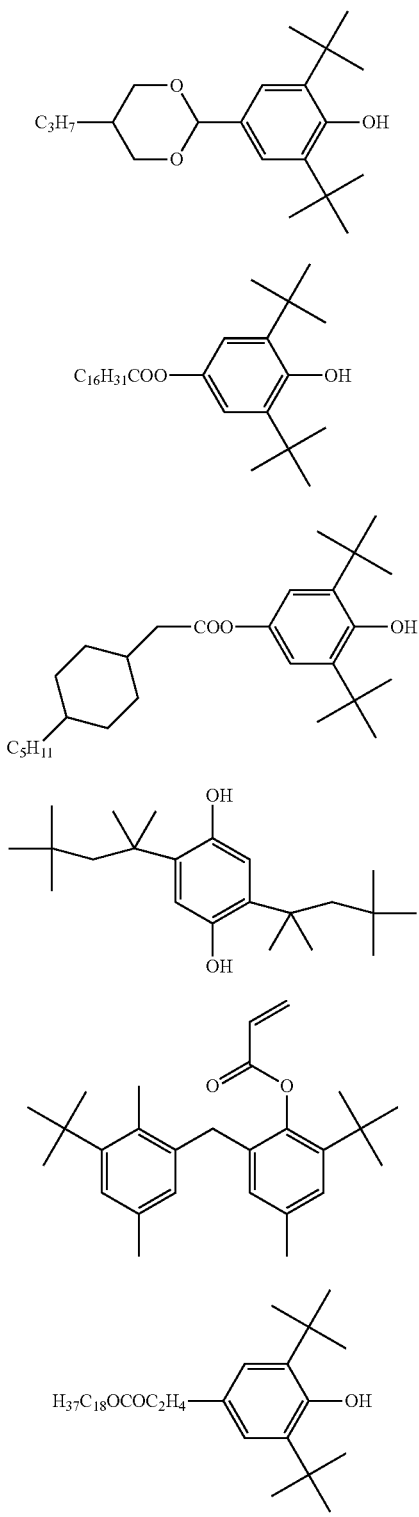

The concentration of the antioxidant is preferably in the range of 1 ppm to 10 wt %. The antioxidant contained at a concentration in such a range can prevent oxygen having entered the liquid crystal panel from the outside from oxidizing the liquid crystal material, effectively preventing image sticking and stains due to oxides. Also, the antioxidant, as well as the radical scavenger, can partially deactivate radicals generated from the photo-alignment films, particularly sufficiently achieving the effect of reducing a decrease in VHR. The lower limit of the concentration is more preferably 10 ppm, while the upper limit is more preferably 5 wt %, still more preferably 1 wt %.

The alignment mode of the liquid crystal panel is not particularly limited, and may be, for example, a horizontal alignment mode such as a fringe field switching (FFS) mode or an in-plane switching (IPS) mode; a vertical alignment mode; or a twisted nematic (TN) mode.

In the case that the alignment mode of the liquid crystal panel is a horizontal alignment mode, radicals are likely to be generated from the photo-alignment films. Hence, the effect of adding a radical scavenger can be significant. More specifically, the photo-alignment treatment (irradiation with polarized UV light) in a vertical alignment mode is just setting the pre-tilt angle direction to a direction slightly tilted from 90°, while the photo-alignment treatment in a horizontal alignment mode requires control of the azimuth direction (direction in the substrate plane) of the liquid crystal alignment with a higher precision. The irradiation dose in the photo-alignment treatment in the horizontal alignment mode is therefore usually one or more digits greater than that in the vertical alignment mode, and the treatment is accompanied by an adverse effect that a larger number of radicals are likely to be generated than that in the vertical alignment mode. Since the radical scavenger contained in the liquid crystal layer can deactivate the radicals generated in the photo-alignment treatment, the radical scavenger can effectively prevent the radicals from remaining in the completed liquid crystal panel (after injection of liquid crystal).

In the FFS mode, at least one of the substrates 21 includes a structure (FFS electrode structure) with a planar electrode, slit electrodes, and an insulating film disposed between the planar electrode and the slit electrodes, so that oblique electric fields (fringe electric fields) are generated in the liquid crystal layer 23 adjacent to the substrate 21. Typically, the components are disposed in the order from the liquid crystal layer 23 side of the slit electrodes, the insulating film, and the planar electrode. Each slit electrode may be, for example, a slit electrode including linear openings (slits) entirely surrounded by the electrode, or a comb-shaped slit electrode provided with comb teeth and linearly cut portions (slits) that are formed between the comb teeth.

In the IPS mode, at least one of the substrates 21 includes paired comb electrodes which generate transverse electric fields in the liquid crystal layer 23 adjacent to the substrate 21. The paired comb electrodes may be, for example, electrodes that are each including comb teeth and are disposed with the comb teeth of the respective electrodes being engaged with each other.

In the liquid crystal panel 20 of the present embodiment, typically, the paired substrates 21 are attached to each other with the sealant (not illustrated) disposed to surround the liquid crystal layer 23, so that the liquid crystal layer 23 is held in the given region. The sealant may be, for example, an epoxy resin containing inorganic or organic filler and a curing agent.

The paired substrates 21 each may be provided with a polarizer (linear polarizer) on the side opposite to the liquid crystal layer 23. Typical examples of the polarizer include those obtained by aligning a dichroic anisotropic material such as an iodine complex adsorbed on a polyvinyl alcohol (PVA) film. Generally, each surface of the PVA film is laminated with a protective film such as a triacetyl cellulose film before the film is put into practical use. An optical film such as a retardation film may be disposed between the polarizer and each of the substrates 21.

As illustrated in FIG. 1, the liquid crystal display device of the present embodiment is provided with the backlight 10 on the back surface side of the liquid crystal panel. A liquid crystal display device with such a configuration is usually called a transmissive liquid crystal display device. The backlight 10 may be any backlight that emits light including visible light, and may be one that emits light with only visible light or emits light including both visible light and ultraviolet light. In order to enable the liquid crystal display device to provide color display, a backlight emitting white light is suitable for the backlight 10. The suitable types of the backlight 10 include, for example, light emitting diodes (LEDs). The "visible light" as used herein refers to light (electromagnetic waves) having a wavelength of 380 nm to shorter than 800 nm.

The present invention has a feature in deactivating, with a radical scavenger, radicals generated from the photo-alignment films under exposure to the backlight 10 illumination. The radical scavenger can therefore be effectively used in the case that the emission spectrum of the backlight 10 at least partially overlaps the absorption spectra of the photo-alignment films.

The liquid crystal display device of the present embodiment has a configuration including, as well as the liquid crystal panel 20 and the backlight 10, components such as external circuits such as a tape-carrier package (TCP) and a printed circuit board (PCB); optical films such as a viewing angle-increasing film and a luminance-increasing film; and a bezel (frame). Some components, if appropriate, may be incorporated into another component. In addition to the components described above, the liquid crystal display device may include any components that are usually used in the field of liquid crystal display devices. The additional components are therefore not described here.

Each and every detail described for the above embodiment of the present invention shall be applied to all the aspects of the present invention.

The present invention is described below in more detail based on examples and comparative examples. The examples, however, are not intended to limit the scope of the present invention.

Example 1

A liquid crystal panel in the fringe field switching mode (FFS mode) was actually produced by the following method.

First, a TFT substrate including components such as TFTs and FFS electrode structures and a color filter substrate (CF substrate) including components such as a black matrix and color filters were prepared. To the surface of each of the TFT substrate and the CF substrate was applied an alignment film solution. The solids content of the alignment film solution was a polymer material containing a polyamic acid structure and a photo-reactive azobenzene structure in the main chain.

In order to volatilize the solvent in the alignment film solution, the substrates were heated at 70° C. Subsequently, the photo-alignment treatment was performed by irradiating the surfaces of the substrates with linearly polarized light having a dominant wavelength of 365 nm with an intensity of 2000 mJ/cm². The polarization direction of the linearly polarized light was set to be orthogonal to the alignment direction of the liquid crystal. The azobenzene structure, when irradiated with linearly polarized light, underwent a trans-cis isomerization reaction, thereby exerting the alignment force. The trans-azobenzene has a structure represented by the following formula (B-5-1), and the cis-azobenzene has a structure represented by the following formula (B-5-2).

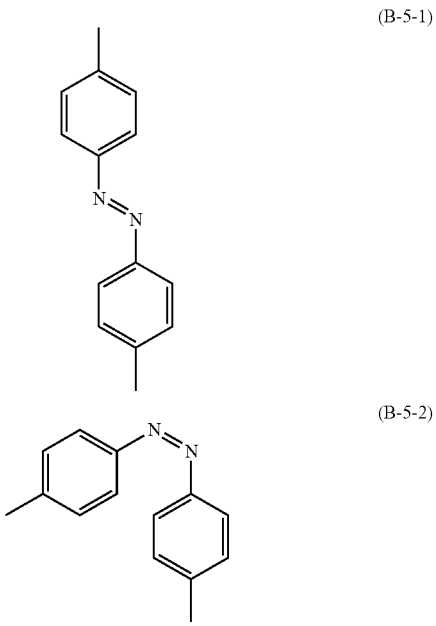

The substrates were then heated (post-baked) at 220° C. The post-baking caused partial imidization (cyclodehydration) of the polyamic acid structure to generate a polyimide structure. Thereby, horizontal alignment films exerting a sufficient alignment force were obtained by photo-irradiation. The post-baked alignment films each had a thickness of 100 nm.

A liquid crystal composition was dropped on the TFT substrate, while a heat/visible light-curable sealant was poured with a dispenser on the CF substrate. The TFT substrate and the CF substrate were then attached to each other, so that the liquid crystal composition was sealed between the substrates. During attachment of the substrates, the sealant was exposed to light for curing, with the display region shielded from light.

The liquid crystal composition used was one obtained by adding a hindered amine compound (radical scavenger) represented by the following formula (F-1-2) to a liquid crystal material containing a compound with an alkenyl structure represented by the following formula (D-1-1). The concentration of the hindered amine compound in the whole liquid crystal composition was 200 ppm. The liquid crystal material had negative anisotropy of dielectric constant ($\Delta\varepsilon=-3.5$).

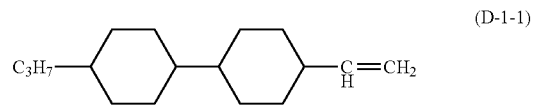

(F-1-2)

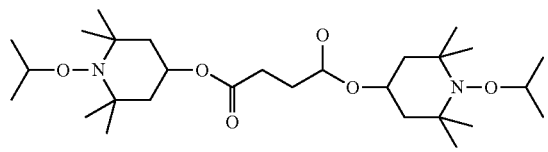

The liquid crystal composition was then heated at 130° C. for 40 minutes, and thereby the liquid crystal molecules were re-aligned. Paired polarizers were attached to the back surface side of the TFT substrate (backlight illumination incident surface side) and the viewing side of the CF substrate (backlight illumination emission surface side), with the polarization axes being arranged in crossed Nicols. Thereby, a FFS mode liquid crystal panel was produced. A backlight with white LEDs was then mounted on the back surface side of the liquid crystal panel, whereby a liquid crystal display device of Example 1 was completed.

Comparative Example 1

A FFS mode liquid crystal panel was produced by the same procedure as that in Example 1 except that the hindered amine compound was not added to the liquid crystal composition.

Comparative Example 2

A FFS mode liquid crystal panel was produced by the same procedure as that in Example 1, except that the photo-alignment films exerting an alignment force by photo-irradiation were replaced by rubbed alignment films exerting an alignment force by rubbing treatment, and that the hindered amine compound was not added to the liquid crystal composition.

In Comparative Example 2, the solids content in the alignment film solution was a polymer material containing a polyamic acid structure in the main chain. Also, the photo-alignment treatment was not performed, and the rubbing treatment was performed.

(Evaluation Test 1)

Figure 5:
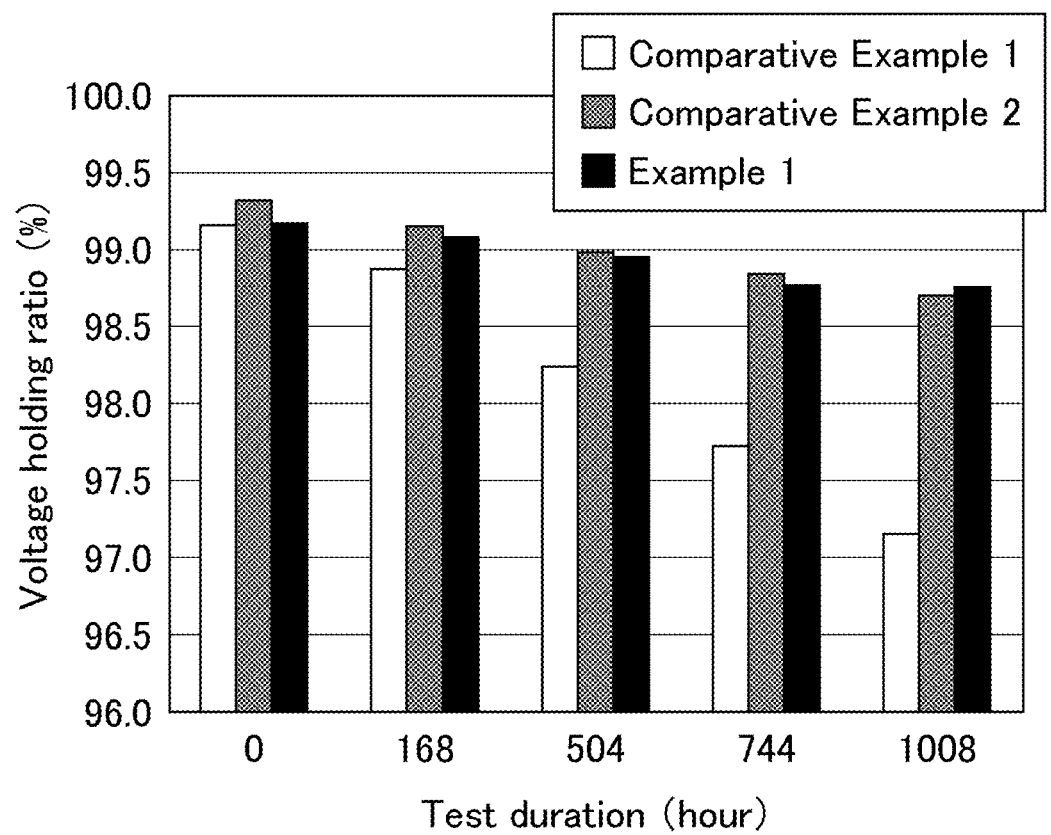
FIG. 5 is a graph showing changes over time in the voltage holding ratio of the liquid crystal panels of Example 1 and Comparative Examples 1 and 2.

The liquid crystal panels produced in Example 1 and Comparative Examples 1 and 2 each were kept being electrically charged with the backlight on, such that changes over time in the voltage holding ratio were determined. FIG. 5 is a graph showing changes over time in the voltage holding ratio of the liquid crystal panels of Example 1 and Comparative Examples 1 and 2.

As shown in FIG. 5, comparison between Example 1 and Comparative Example 1 shows that addition of the hindered amine compound to the liquid crystal material reduced the decrease in the voltage holding ratio. Comparison between Comparative Example 1 and Comparative Example 2 shows that the significant decrease in the voltage holding ratio in Comparative Example 1 was due to the photo-alignment films. In other words, the results clearly show that the effects obtained in Example 1 can be achieved more markedly with a combination of the radical scavenger (hindered amine compound) and the photo-alignment films.

The decrease in the voltage holding ratio due to the photo-alignment films was presumably caused by the following mechanism.

The azobenzene structure contained in the photo-alignment films used in Example 1 and Comparative Example 1 is alignment-treated by light having a wavelength of 365 nm which is in a region near the visible light region. Meanwhile, the backlight of the liquid crystal display device mainly emits light including visible light for color display. Here, the results of Comparative Example 1 suggest that the short wavelength side of the backlight emission spectrum and the long wavelength side of the absorption spectrum of the azobenzene structure slightly overlapped each other, though the overlap may not have been easily detected in an actual spectrum analysis, and thus radicals were generated. For example, as shown in the following reaction scheme, the backlight illumination may have caused a light cleavage reaction of the azobenzene structure. In contrast, the results of Example 1 show that the hindered amine compound effectively deactivated the radicals generated in the reaction of the photo-alignment films, preventing a decrease in the voltage holding ratio.

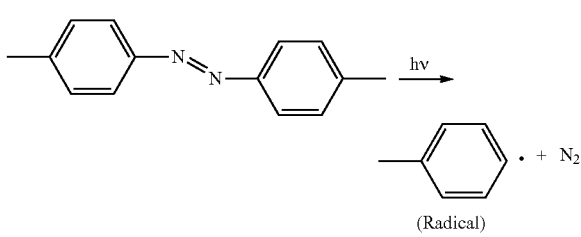

Photo-reactive sites that are alignment-treated by light having a wavelength in a region near the visible light region similarly to the azobenzene structure include, for example, structures such as cinnamate, chalcone, coumarin, stilbene, and phenolic esters. All of these photo-reactive sites are considered to absorb, though slightly, light having a wavelength of 340 nm or longer. Hence, they can also absorb the backlight illumination to generate radicals, similarly to the azobenzene structure. For example, cinnamate, chalcone, and phenolic esters undergo photo-Fries rearrangement (ester group cleavage) to generate radicals, while chalcone undergoes hydrogen abstraction or light cleavage to generate radicals as shown in the following reaction scheme. Accordingly, also in the case of using photo-alignment films with any of these photo-reactive sites, a radical scavenger such as a hindered amine compound is preferably added to the liquid crystal material.

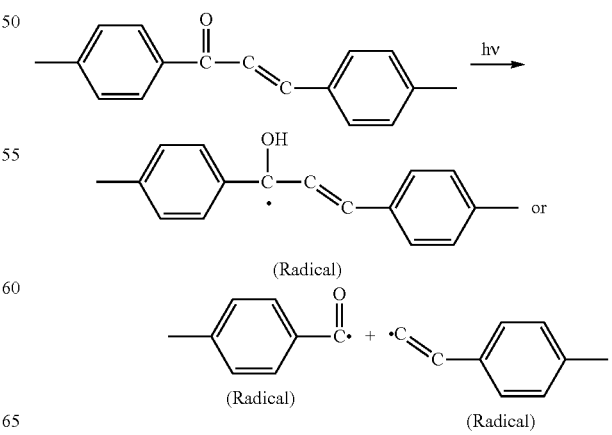

Also, a liquid crystal component containing an alkenyl structure is effective in decreasing the viscosity of the liquid crystal material. However, the double bond in an alkenyl structure is vulnerable to radical attacks, and therefore tends to be a cause of a decrease in VHR when such a liquid crystal component is used in combination with the photo-alignment films that can be a source of radicals. In Example 1, the addition of a hindered amine compound to the liquid crystal material enabled effective prevention of radical attacks to the alkenyl structure. For an increase in the response rate of the liquid crystal display device, the liquid crystal component containing an alkenyl structure is preferably added not only to a liquid crystal material having negative anisotropy of dielectric constant but also to a liquid crystal material having positive anisotropy of dielectric constant.

Example 2

A liquid crystal display device including a FFS mode liquid crystal panel was actually produced by the following method.

First, a TFT substrate including components such as TFTs and FFS electrode structures and a CF substrate including components such as a black matrix and color filters were prepared. To the surface of each of the TFT substrate and the CF substrate was applied an alignment film solution. The solids content of the alignment film solution was a polymer material containing a polyamic acid structure obtained by polymerizing an acid anhydride represented by the following formula (B-7-1) and an amine compound represented by the following formula (B-7-2). Here, hydrogen atoms in cyclobutane in the acid anhydride represented by the following formula (B-7-1) may each be replaced by another atom or functional group.

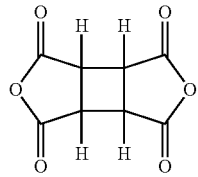

(B-7-1)

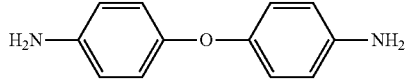

(B-7-2)

In order to volatilize the solvent in the alignment film solution, the substrates were heated at 70° C. Subsequently, the substrates were heated (post-baked) at 230° C. The post-baking caused partial imidization (cyclodehydration) of the polyamic acid structure to generate a polyimide structure. The photo-alignment treatment was then performed by irradiating the surfaces of the substrates with linearly polarized light having a dominant wavelength of 254 nm with an intensity of 600 mJ/cm². The polarization direction of the linearly polarized light was set to be orthogonal to the alignment direction of the liquid crystal. As shown in the following scheme (B-7-I), the cyclobutane site, when irradiated with linearly polarized light, underwent a decomposition reaction and cleaved. The cleavage caused dissipation of the alignment force in the polymer chain direction, causing exertion of the alignment force in an azimuth direction orthogonal to the dissipated force. Thereby, horizontal alignment films exerting a sufficient alignment force were obtained by photo-irradiation. The post-baked alignment films each had a thickness of 100 nm.

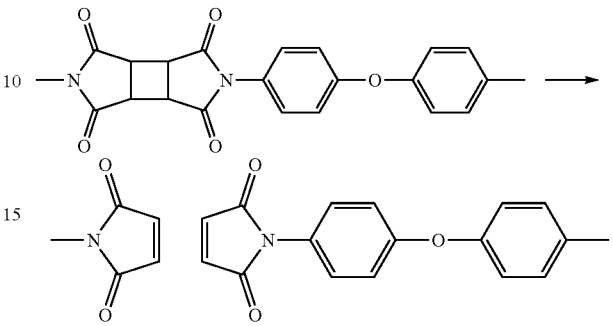

(B-7-I)

A liquid crystal composition was dropped on the TFT substrate, while a heat/visible light-curable sealant was poured with a dispenser on the CF substrate. The TFT substrate and the CF substrate were then attached to each other, so that the liquid crystal composition was sealed between the substrates. During attachment of the substrates, the sealant was exposed to light for curing, with the display region shielded from light.

The liquid crystal composition used was one obtained by adding the same hindered amine compound (radical scavenger) represented by the above formula (F-1-2) as that in Example 1 to a liquid crystal material containing a compound with an alkoxy structure represented by the following formula (E-3-1). The concentration of the hindered amine compound in the whole liquid crystal composition was 200 ppm. The liquid crystal material had negative anisotropy of dielectric constant ($\Delta\varepsilon=-3.5$).

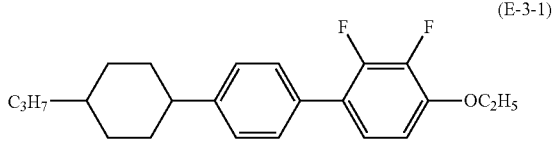

(E-3-1)

The liquid crystal composition was then heated at 130° C. for 40 minutes, and thereby the liquid crystal molecules were re-aligned. Paired polarizers were attached to the back surface side of the TFT substrate (backlight illumination incident surface side) and the viewing side of the CF substrate (backlight illumination emission surface side), with the polarization axes being arranged in crossed Nicols. Thereby, a FFS mode liquid crystal panel was produced. A backlight with white LEDs was then mounted on the back surface side of the liquid crystal panel, whereby a liquid crystal display device of Example 2 was completed.

Comparative Example 3

A liquid crystal display device of Comparative Example 3 was produced by the same procedure as that in Example 2, except that the hindered amine compound was not added to the liquid crystal composition.

(Evaluation Test 2)

The liquid crystal display devices produced in Example 2 and Comparative Example 3 each were kept being electrically charged with the backlight on. Here, a white box pattern was displayed to the liquid crystal display device screen with a black background. After 500 hours, the displayed image was entirely changed to a gray image at a grayscale value of 64. As a result, the liquid crystal display device of Comparative Example 3 caused stain-like image sticking around the box pattern. In contrast, the liquid crystal display device of Example 2 did not cause such image sticking.

As shown in the following reaction scheme, the cyclobutane structure contained in the photo-alignment films used in Example 2 usually mainly absorbs light having a wavelength of 300 nm or shorter and generates radicals in an intermediate stage of the reaction. Yet, such photo-alignment films containing a cyclobutane structure may be modified to contain a structure with a high light absorbance for reduction of the exposure dose in the alignment treatment. For example, a skeleton with a high light absorbance may be selected for a diamine site and the absorbed light energy may be transferred to the cyclobutane site to promote the light cleavage of the cyclobutane site. Such modification may increase the light absorbance of the photo-alignment films for light having a longer wavelength, but may cause the short wavelength side of the emission spectrum of the backlight to overlap the long wavelength side of the absorption spectra of the photo-alignment films. Also, since the exposure dose in the alignment treatment is as high as several hundreds of millijoules or higher per square centimeter, some radicals generated in the alignment treatment may not yet be deactivated after the completion of the liquid crystal panel. For this reason, decomposition-type photo-alignment films containing a cyclobutane structure also include a cause of image sticking, and thus the liquid crystal display device of Comparative Example 3 caused image sticking. The results of Example 2 show that the hindered amine compound effectively deactivated radicals generated in the reaction of the photo-alignment films, and thereby prevented image sticking.

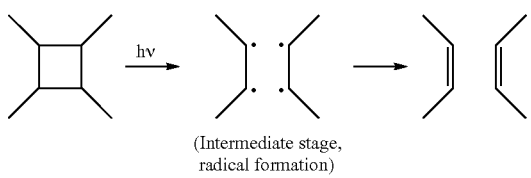

(Intermediate stage, radical formation)

The alkoxy structure in the liquid crystal material used in Example 2 is suitable for controlling the anisotropy of dielectric constant of a liquid crystal material (negative liquid crystal) having negative anisotropy of dielectric constant. As to liquid crystal materials (positive liquid crystal) having positive anisotropy of dielectric constant, the anisotropy of dielectric constant can be easily controlled without use of alkoxy groups. In a conventional liquid crystal display device, use of a liquid crystal material containing an alkoxy structure tends to decrease the VHR, and the tendency was significant especially when such a liquid crystal material is combined with photo-alignment films. Such a decrease in VHR can be reduced by adding a radical scavenger as in the present invention. The reason therefor can be explained based on the following Hypothetical Models 1 to 4.

[Hypothetical Model 1]

As shown in the following reaction scheme, an alkoxy structure (—OR) is vulnerable to the attack of a radical $R_{AL}$ generated from a photo-alignment film, and undergoes any of the four radical generation reaction patterns. When the generated radicals are ionized, the VHR is decreased.

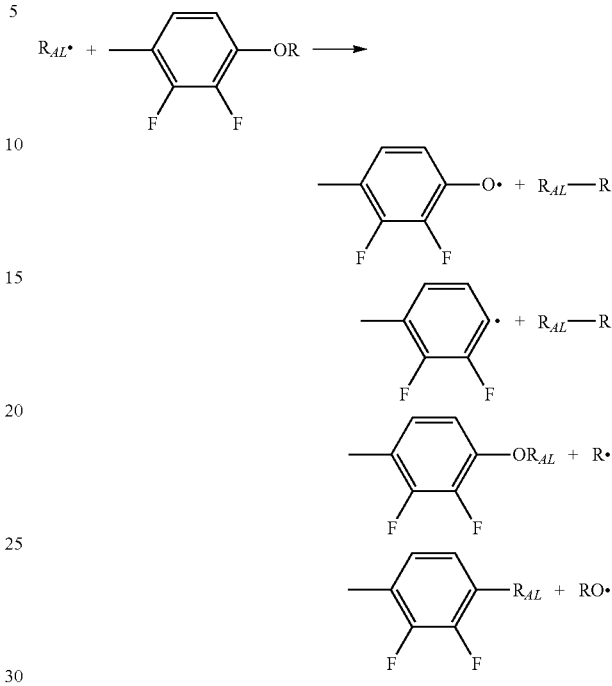

[Hypothetical Model 2]

As shown in the following reaction scheme, the radical $R_{AL}$ generated from a photo-alignment film binds to oxygen in the liquid crystal layer to form a peroxide structure (ROO.). The alkoxy structure (—OR) is vulnerable to the attack of the peroxide structure, and undergoes any of the five radical generation reaction patterns. Also in each pattern, the radical generation reactions occur in chains, with one radical generation reaction followed by another radical generation reaction. When the generated radicals are ionized, the VHR is decreased. This radical chain reaction with the peroxide structure is known as an autoxidation reaction.

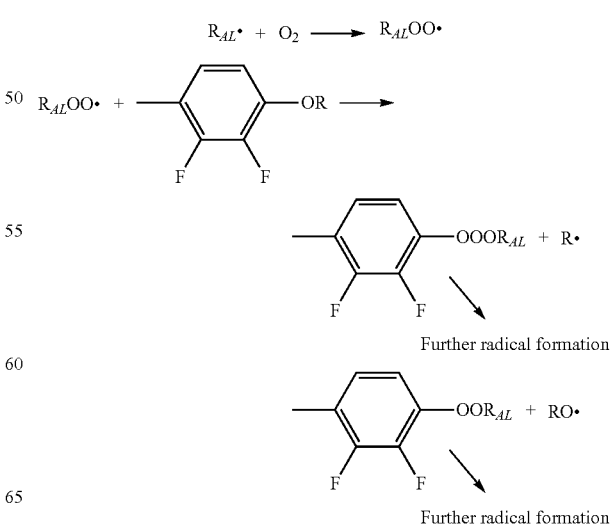

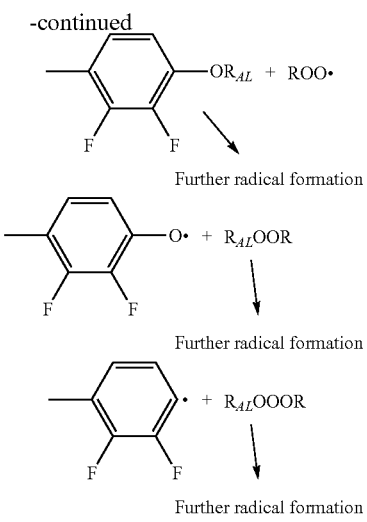

[Hypothetical Model 3]

Alkoxy structures (especially methoxy and ethoxy groups) are electron-donating groups and are converted to their resonance structures under light exposure. The following scheme shows a part of a compound with an alkoxy structure, with three resonance structures of the alkoxy structure. Among these, the resonance structure (a) shown at the center and the resonance structure (b) shown on the right are ionized and can be the causes of a decrease in VHR. Furthermore, the resonance structures (a) and (b) are respectively converted into structures (a') and (b') each having a peroxide structure in the presence of oxygen. The structures (a') and (b') each having a peroxide structure respectively easily generate radicals represented by the structures (a") and (b"). When the generated radicals are ionized, the VHR is decreased.

[Hypothetical Model 4]

Negative liquid crystal containing an alkoxy structure consists of molecular structures with large polarization. The negative liquid crystal therefore has a higher solubility of impurity ions and is more likely to contain mobile ions than positive liquid crystal. Since mobile ions have an effect of canceling out the charges, the VHR is decreased.

Since the above Hypothetical Models 1 to 3 involve radicals, the models can be dealt by employing a radical scavenger to trap the radicals. Hypothetical Model 4 describes that the ionic impurities generated through radical generation have a greater influence on the negative liquid crystal than on the positive liquid crystal, which suggests that trapping radicals indirectly solves the problem of Hypothetical Model 4. Consequently, addition of a radical scavenger to a liquid crystal layer can achieve an effect of reducing a decrease in VHR caused by use of a liquid crystal material containing an alkoxy structure.

Example 3

A liquid crystal display device including a FFS mode liquid crystal panel was actually produced by the following method.

First, a TFT substrate including components such as TFTs and FFS electrode structures and a CF substrate including components such as a black matrix and color filters were prepared. To the surface of each of the TFT substrate and the CF substrate was applied an alignment film solution. The solids content of the alignment film solution was a polymer material containing a polysiloxane structure as the main skeleton and a cinnamate group represented by the following formula (B-1) functioning as a photo-functional group in a side chain.

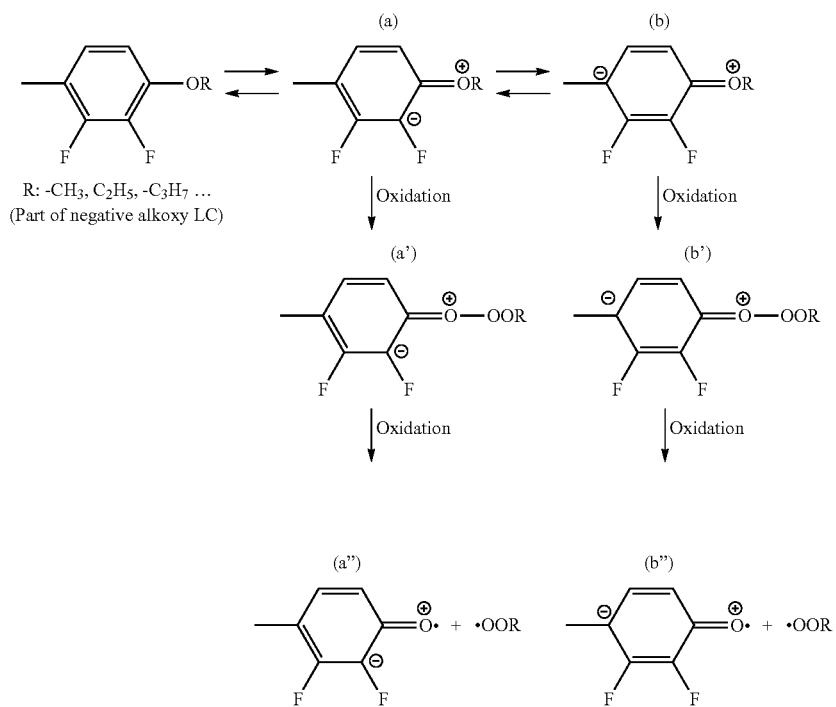

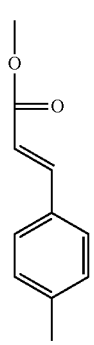

(B-1)

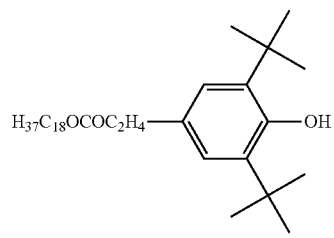

(G-g)

In order to volatilize the solvent in the alignment film solution, the substrates were heated at 70° C. Subsequently, the substrates were heated (post-baked) at 230° C. The photo-alignment treatment was then performed by irradiating the surfaces of the substrates with linearly polarized light having a dominant wavelength of 313 nm with an intensity of 200 mJ/cm$^2$. The polarization direction of the linearly polarized light was set to be orthogonal to the alignment direction of the liquid crystal. The cinnamate group, when irradiated with linearly polarized light, underwent isomerization and dimerization reactions, exerting the alignment force. Thereby, horizontal alignment films exerting a sufficient alignment force were obtained by photo-irradiation. The post-baked alignment films each had a thickness of 100 nm.

A liquid crystal composition was dropped on the TFT substrate, while a heat/visible light-curable sealant was poured with a dispenser on the CF substrate. The TFT substrate and the CF substrate were then attached to each other, so that the liquid crystal composition was sealed between the substrates. During attachment of the substrates, the sealant was exposed to light for curing, with the display region shielded from light.

The liquid crystal composition used was one obtained by adding a hindered amine compound (radical scavenger) represented by the following formula (F-1-5) and an antioxidant represented by the following formula (G-g) to a liquid crystal material containing a compound with the same alkenyl structure represented by the above formula (D-1-1) as that in Example 1. The concentration of the hindered amine compound in the whole liquid crystal composition was 200 ppm. The concentration of the antioxidant in the whole liquid crystal composition was 0.1 wt %. The liquid crystal material had positive anisotropy of dielectric constant ($\Delta\epsilon$=+9.0).

The liquid crystal composition was then heated at 130° C. for 40 minutes, and thereby the liquid crystal molecules were re-aligned. Paired polarizers were attached to the back surface side of the TFT substrate (backlight illumination incident surface side) and the viewing side of the CF substrate (backlight illumination emission surface side), with the polarization axes being arranged in crossed Nicols. Thereby, a FFS mode liquid crystal panel was produced. A backlight with white LEDs was then mounted on the back surface side of the liquid crystal panel, whereby a liquid crystal display device of Example 3 was completed.

Comparative Example 4

A liquid crystal display device of Comparative Example 4 was produced by the same procedure as that in Example 3, except that the hindered amine compound and the antioxidant were not added to the liquid crystal composition.
(Evaluation Test 3)

The liquid crystal display devices produced in Example 3 and Comparative Example 4 each were kept being electrically charged with the backlight on. Here, a white image was displayed to the entire screen of the liquid crystal display device. After 500 hours, the displayed image was entirely changed to a gray image at a grayscale value of 64. As a result, the liquid crystal display device of Comparative Example 4 caused stain-like unevenness at the edges of the screen. This unevenness is presumably caused by a decrease in VHR. In contrast, the liquid crystal display device of Example 3 did not cause such unevenness.

Example 4

A liquid crystal display device including a FFS mode liquid crystal panel was actually produced by the following method.

First, a TFT substrate including components such as TFTs and FFS electrode structures and a CF substrate including components such as a black matrix and color filters were prepared. To the surface of each of the TFT substrate and the CF substrate was applied an alignment film solution. The solids content of the alignment film solution was a polymer material containing a polysiloxane structure as the main

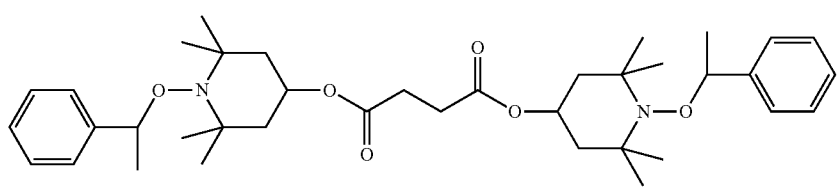

(F-1-5)

skeleton and a cinnamate group functioning as a photo-functional group in a side chain.

In order to volatilize the solvent in the alignment film solution, the substrates were heated at 70° C. Subsequently, the substrates were heated (post-baked) at 230° C. The photo-alignment treatment was then performed by irradiating the surfaces of the substrates with linearly polarized light having a dominant wavelength of 313 nm with an intensity of 20 mJ/cm$^2$. The polarization direction of the linearly polarized light was set to be orthogonal to the alignment direction of the liquid crystal. The cinnamate group, when irradiated with linearly polarized light, underwent isomerization and dimerization reactions, exerting the alignment force. Thereby, horizontal alignment films exerting an alignment force were obtained by photo-irradiation. The post-baked alignment films each had a thickness of 100 nm. In the present example, the exposure dose in the photo-alignment treatment was set lower than that in Example 3 utilizing the same alignment film solution. Still, the alignment force was enhanced by polymerizing a photo-polymerizable monomer added to the liquid crystal material on the surfaces of the alignment films as described below.

A liquid crystal composition was dropped on the TFT substrate, while a heat/visible light-curable sealant was poured with a dispenser on the CF substrate. The TFT substrate and the CF substrate were then attached to each other, so that the liquid crystal composition was sealed between the substrates. During attachment of the substrates, the sealant was exposed to light for curing, with the display region shielded from light.

The liquid crystal composition used was one obtained by adding a photo-polymerizable monomer represented by the following formula (C-1-1), the same hindered amine compound (radical scavenger) represented by the above formula (F-1-5) as that in Example 3, and the antioxidant represented by the above formula (G-g) to a liquid crystal material containing a compound with the same alkenyl structure represented by the above formula (D-1-1) as that in Example 1. The proportion of the photo-polymerizable monomer in the whole liquid crystal composition was 0.25 wt %. The concentration of the hindered amine compound in the whole liquid crystal composition was 200 ppm. The concentration of the antioxidant in the whole liquid crystal composition was 0.1 wt %. The liquid crystal material had negative anisotropy of dielectric constant ($\Delta\varepsilon=-3.5$).

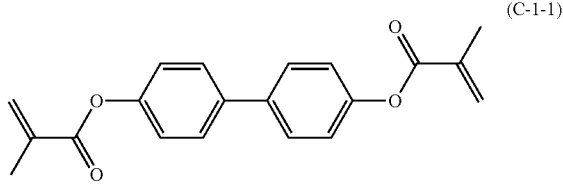 [SMILES: C=C(C)C(=O)Oc1ccc(-c2ccc(OC(=O)C(=C)C)cc2)cc1]

(C-1-1)

Here, the photo-polymerizable monomer may be a monomer other than the monomer represented by the above formula (C-1-1). For example, a monomer represented by the above formula (C-1-2) obtained by substituting an acrylate group for the terminal methacrylate group in the monomer represented by the formula (C-1-1), or a monomer represented by the above formula (C-1-3) obtained by substituting phenanthrene for the skeleton in the monomer represented by the formula (C-1-1) may be used. Also, in the formulas (C-1-1), (C-1-2), and (C-1-3), hydrogen atoms present in the skeleton may each independently be replaced by a halogen atom.

After the sealant was cured, the display region of the liquid crystal panel was irradiated with black light with an intensity of 3000 mJ/cm$^2$. Thereby, the photo-polymerizable monomer in the liquid crystal layer was polymerized on the surfaces of the alignment films by taking in the liquid crystal molecules. As a result, the liquid crystal alignment on the surfaces of the alignment films was fixed by the polymer of the photo-polymerizable monomer, whereby a sufficient alignment force was achieved.

The liquid crystal composition was then heated at 130° C. for 40 minutes, and thereby the liquid crystal molecules were re-aligned. Paired polarizers were attached to the back surface side of the TFT substrate (backlight illumination incident surface side) and the viewing side of the CF substrate (backlight illumination emission surface side), with the polarization axes being arranged in crossed Nicols. Thereby, a FFS mode liquid crystal panel was produced. A backlight with white LEDs was then mounted on the back surface side of the liquid crystal panel, whereby a liquid crystal display device of Example 4 was completed.

Comparative Example 5

A liquid crystal display device of Comparative Example 5 was produced by the same procedure as that in Example 4, except that the hindered amine compound and the antioxidant were not added to the liquid crystal composition.
(Evaluation Test 4)

The liquid crystal display devices produced in Example 4 and Comparative Example 5 each were kept being electrically charged with the backlight on. Here, a white image was displayed to the entire screen of the liquid crystal display device. After 500 hours, the displayed image was entirely changed to a gray image at a grayscale value of 64. As a result, the liquid crystal display device of Comparative Example 5 caused stain-like unevenness at the edges of the screen. This unevenness is presumably caused by a decrease in the voltage holding ratio. In contrast, the liquid crystal display device of Example 4 did not cause such unevenness.

The photo-polymerizable monomer used in Example 4 and Comparative Example 5 can be a source of radicals. Hence, in Example 4 and Comparative Example 5 with the sources of radicals, namely the photo-polymerizable monomer and the photo-alignment films, radicals are likely to be generated in the liquid crystal layer. Such radicals generated in the reaction of the photo-alignment films and photo-polymerizable monomers remaining after the PSA treatment can be effectively deactivated by adding a hindered amine compound to the liquid crystal material. Also, the same effect can be achieved by adding an antioxidant to the liquid crystal material. As described above, the liquid crystal display device of Comparative Example 5 caused unevenness, but the liquid crystal display device of Example 4 effectively prevented unevenness.

ADDITIONAL REMARKS

One aspect of the present invention may be a liquid crystal display device, including: an active-matrix liquid crystal panel; and a backlight. The liquid crystal panel may include a liquid crystal layer, paired substrates holding the liquid crystal layer in between, and alignment films disposed on the liquid crystal layer side surfaces of the respective paired substrates. The alignment films may each be a photo-alignment film formed from a material exhibiting photo-alignment performance. The liquid crystal layer may contain a liquid crystal material and a radical scavenger. This aspect enables deactivation of radicals released to the liquid crystal layer with a radical scavenger, preventing a decrease in VHR. Thereby, the liquid crystal display device, with the photo-alignment films, can maintain a favorable VHR for a long period of time and prevent generation of image sticking and stains on the display screen.

The radical scavenger preferably contains a compound represented by the following formula (1). A hindered amine compound represented by the following formula (1) used as the radical scavenger can keep deactivating radicals based on a circulative cycle. Therefore, a small amount of the hindered amine compound enables reduction of a decrease in VHR due to exposure to the backlight illumination for a long period of time. Also, the hindered amine compound, being highly reactive with radicals generated from the photo-alignment films, can readily deactivate the radicals in the liquid crystal layer.

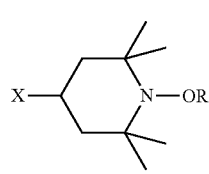

(1)

In the formula, X represents a monovalent organic group, and R represents a hydrocarbon group.

The liquid crystal layer may further contain an antioxidant. Suitable examples of the antioxidant include compounds represented by the following formula (2). The antioxidant can prevent a decrease in VHR due to radicals generated from oxidants that are generated through oxidation of a structure such as an alkyl group (R) contained in the liquid crystal material, alignment films, and sealant by oxygen having entered the liquid crystal panel.

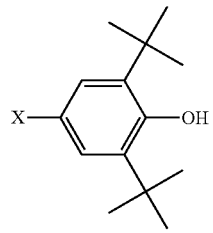

(2)

In the formula, X represents a monovalent organic group.

Examples of the photo-alignment film include those containing at least one photo-reactive site selected from the group consisting of cinnamate, chalcone, coumarin, stilbene, azobenzene, and phenolic esters. Also, the photo-alignment film may be formed from a polymer obtained by polymerizing a monomer that contains an acid anhydride represented by the following formula (3). The long wavelength side of the absorption spectrum of each of these photo-alignment films overlaps the short wavelength side of the backlight emission spectrum, and thus radicals are generated upon irradiation with the backlight illumination. Hence, the effect of preventing a decrease in VHR can be effectively achieved with a radical scavenger.

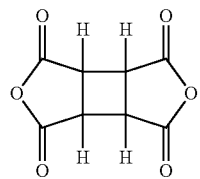

(3)

In the formula, hydrogen atoms may each be replaced.

The liquid crystal material may contain at least a compound containing an alkenyl structure. Examples of the compound containing an alkenyl structure include compounds represented by the following formula (4-1), (4-2), or (4-3). Although a liquid crystal component containing an alkenyl structure is effective in decreasing the viscosity of the liquid crystal material, the double bond in an alkenyl structure is vulnerable to radical attacks. Hence, the effect of preventing a decrease in VHR can be effectively achieved with a radical scavenger.

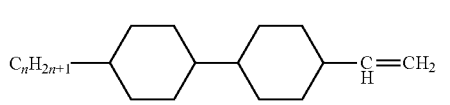

(4-1)

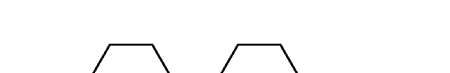

(4-2)

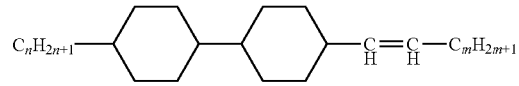

(4-3)

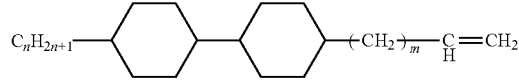

In the formulas, m and n are the same or different integers.

The liquid crystal material may have negative anisotropy of dielectric constant. In conventional liquid crystal display devices, the defects, namely image sticking and stains, tend to appear more significantly in the case of a liquid crystal material having negative anisotropy of dielectric constant than in the case of a liquid crystal material having positive anisotropy of dielectric constant. Hence, the effect of preventing a decrease in VHR can be effectively achieved with a radical scavenger.

The liquid crystal material may contain at least a compound containing an alkoxy structure. Examples of the compound containing an alkoxy structure include compounds represented by the following formula (5-1), (5-2), (5-3), (5-4), or (5-5). Since the resonance structures of the alkoxy structures (especially methoxy and ethoxy groups) include ionized ones, they can be a cause of a decrease in VHR. Hence, the effect of preventing a decrease in VHR can be effectively achieved with a radical scavenger.

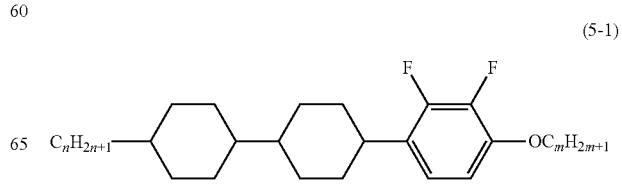

(5-1)

-continued

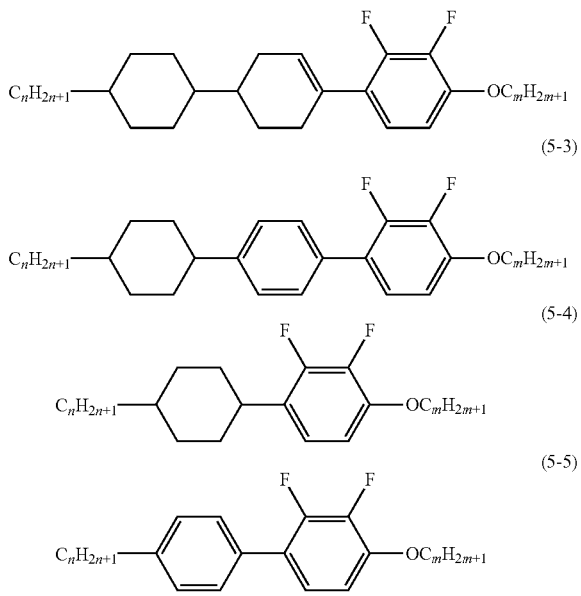

(5-2)

(5-3)

(5-4)

(5-5)

In the formulas, m and n are the same or different integers.

Suitable alignment modes of the liquid crystal panel are a fringe field switching mode and an in-plane switching mode. The photo-alignment treatment in a horizontal alignment mode requires control of the azimuth direction of the liquid crystal alignment with a high precision. The irradiation dose in the photo-alignment treatment in the horizontal alignment mode is therefore usually one or more digits greater than that in the vertical alignment mode, and the treatment is accompanied by an adverse effect that a larger number of radicals are likely to be generated than that in the vertical alignment mode. Hence, the effect of preventing a decrease in VHR can be effectively achieved with a radical scavenger.

The liquid crystal panel may include, on the liquid crystal layer side surface of each alignment film, a layer containing a polymer that is obtained by polymerizing a photo-polymerizable monomer represented by the following formula (6). Examples of Y in the following formula (6) include structures represented by the following formula (7-1), (7-2), or (7-3). In the case of adding a photo-polymerizable monomer to the liquid crystal layer for the PSA treatment, the photo-polymerizable monomer as well as the photo-alignment films is the source of radicals, and therefore radicals are more likely to be generated in the liquid crystal layer. Hence, the effect of preventing a decrease in VHR can be effectively achieved with a radical scavenger.

$$A1-Y-A2 \quad (6)$$

In the formula, Y represents a structure containing at least one benzene ring and/or a condensed benzene ring;

hydrogen atoms in the benzene ring and the condensed benzene ring may each be replaced by a halogen atom; at least one of A1 and A2 represents an acrylate or a methacrylate; and A1 and A2 each directly bind to the benzene ring or the condensed benzene ring.

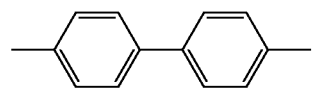

(7-1)

-continued

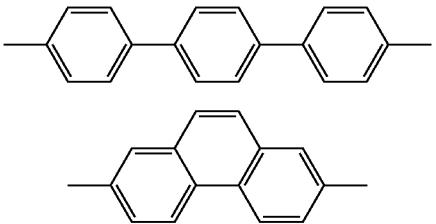

(7-2)

(7-3)

In the formulas, hydrogen atoms may each be replaced by a halogen atom.

The aspects of the present invention described above may appropriately be combined within the spirit of the present invention.

REFERENCE SIGNS LIST

10: backlight
20: liquid crystal panel
21: substrate
22: alignment film
23: liquid crystal layer

The invention claimed is:

1. A liquid crystal display device comprising:
   an active-matrix liquid crystal panel; and
   a backlight,
   the liquid crystal panel including a liquid crystal layer, paired substrates holding the liquid crystal layer in between, and alignment films disposed on the liquid crystal layer side surfaces of the respective substrates,
   the alignment films each being a photo-alignment film formed from a material exhibiting photo-alignment performance,
   the liquid crystal layer containing a liquid crystal material and a radical scavenger; wherein
   the radical scavenger contains a compound represented by the following formula (1):

(1)

$$X-\underset{\diagup\diagdown}{\overset{\diagdown\diagup}{\bigcirc}}N-OR$$

where X represents a monovalent organic group, and R represents a hydrocarbon group; and
the photo-alignment films each contain at least one photo-reactive functional group selected from the group consisting of cinnamate, chalcone, coumarin, stilbene, azobenzene, and phenolic esters.

2. The liquid crystal display device according to claim 1, wherein the liquid crystal layer further contains an antioxidant.

3. The liquid crystal display device according to claim 2, wherein the antioxidant contains a compound represented by the following formula (2):

(2)

[Structure: 2,6-di-tert-butylphenol with X substituent]

wherein X represents a monovalent organic group.

4. The liquid crystal display device according to claim 1, wherein the liquid crystal material contains at least a compound containing an alkenyl structure.

5. The liquid crystal display device according to claim 4, wherein the compound containing an alkenyl structure is represented by the following formula (4-1), (4-2), or (4-3):

(4-1)

$C_nH_{2n+1}$—[cyclohexyl]—[cyclohexyl]—CH=CH$_2$ (4-2)

$C_nH_{2n+1}$—[cyclohexyl]—[cyclohexyl]—CH=CH—$C_mH_{2m+1}$ (4-3)

$C_nH_{2n+1}$—[cyclohexyl]—[cyclohexyl]—(CH$_2$)$_m$—CH=CH$_2$ wherein m and n are the same or different integers.

6. The liquid crystal display device according to claim 1, wherein the liquid crystal material has negative anisotropy of dielectric constant.

7. The liquid crystal display device according to claim 6, wherein the liquid crystal material contains at least a compound containing an alkoxy structure.

8. The liquid crystal display device according to claim 7, wherein the compound containing an alkoxy structure is represented by the following formula (5-1), (5-2), (5-3), (5-4), or (5-5):

(5-1)

$C_nH_{2n+1}$—[cyclohexyl]—[cyclohexyl]—[difluorophenyl]—$OC_mH_{2m+1}$ (5-2)

$C_nH_{2n+1}$—[cyclohexyl]—[cyclohexenyl]—[difluorophenyl]—$OC_mH_{2m+1}$ (5-3)

$C_nH_{2n+1}$—[cyclohexyl]—[phenyl]—[difluorophenyl]—$OC_mH_{2m+1}$ (5-4)

$C_nH_{2n+1}$—[cyclohexyl]—[difluorophenyl]—$OC_mH_{2m+1}$ (5-5)

$C_nH_{2n+1}$—[phenyl]—[difluorophenyl]—$OC_mH_{2m+1}$ wherein m and n are the same or different integers.

9. The liquid crystal display device according to claim 1, wherein the liquid crystal panel includes, on the liquid crystal layer side surface of each alignment film, a layer containing a polymer that is obtained by polymerizing a photo-polymerizable monomer represented by the following formula (6):

A1-Y-A2 (6)

wherein Y represents a structure containing at least one benzene ring and/or a condensed benzene ring; hydrogen atoms in the benzene ring and the condensed benzene ring may each be replaced by a halogen atom; at least one of A1 and A2 represents an acrylate or a methacrylate; and A1 and A2 each directly bind to the benzene ring or the condensed benzene ring.

10. The liquid crystal display device according to claim 9, wherein Y in the above formula (6) is a structure represented by the following formula (7-1), (7-2), or (7-3):

(7-1)

[biphenyl structure]

(7-2)

[terphenyl structure]

(7-3)

[phenanthrene structure]

wherein hydrogen atoms may each be replaced by a halogen atom.

* * * * *